(12) United States Patent
Chen et al.

(10) Patent No.: US 8,296,194 B2
(45) Date of Patent: Oct. 23, 2012

(54) METHOD, MEDIUM, AND SYSTEM FOR RANKING DISHES AT EATING ESTABLISHMENTS

(75) Inventors: Billy Chen, Bellevue, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 12/886,571

(22) Filed: Sep. 21, 2010

(65) Prior Publication Data

US 2012/0072302 A1 Mar. 22, 2012

(51) Int. Cl.
G06Q 30/00 (2012.01)
(52) U.S. Cl. .................................................. 705/26.7
(58) Field of Classification Search ................ 705/26.1, 705/27.1, 26.7
See application file for complete search history.

(56) References Cited

U.S. PATENT DOCUMENTS

| | | | |
|---|---|---|---|
| 5,960,440 A * | 9/1999 | Brenner et al. ...................... 1/1 | |
| 2001/0025279 A1 | 9/2001 | Krulak et al. | |
| 2002/0055878 A1* | 5/2002 | Burton et al. .................. 705/26 | |
| 2003/0171944 A1* | 9/2003 | Fine et al. ......................... 705/1 | |
| 2003/0208110 A1 | 11/2003 | Mault et al. | |
| 2003/0208409 A1 | 11/2003 | Mault | |
| 2004/0143600 A1* | 7/2004 | Musgrove et al. ......... 707/104.1 | |
| 2004/0193495 A1 | 9/2004 | Kim | |
| 2005/0049920 A1 | 3/2005 | Day et al. | |
| 2005/0149507 A1* | 7/2005 | Nye .................................. 707/3 | |
| 2005/0192869 A1* | 9/2005 | Maeda et al. .................... 705/26 | |
| 2006/0074716 A1* | 4/2006 | Tilles et al. ....................... 705/2 | |
| 2007/0027366 A1 | 2/2007 | Osburn | |
| 2007/0179359 A1* | 8/2007 | Goodwin ...................... 600/300 | |
| 2008/0034001 A1 | 2/2008 | Noel | |
| 2008/0147611 A1* | 6/2008 | Bennett ............................. 707/3 | |
| 2009/0157752 A1* | 6/2009 | Gonzalez .................... 707/104.1 | |
| 2010/0274770 A1* | 10/2010 | Gupta et al. ................... 707/688 | |
| 2011/0302148 A1* | 12/2011 | Kakade et al. ................ 707/710 | |

OTHER PUBLICATIONS

Jun. 21, 2010—http://en.gigazine.net/news/20100621_google_recipe/.*
Wang, Liping "Dish Master: An Intelligent and Adaptive Manager for a Web-based Recipe Database System" Proceedings of the Second International Conference on Semantics, Knowledge, and Grid—2006.*
Balko, Radley, "Too Much Information?", Retrieved at <<http://reason.com/archives/2008/06/25/too-much-information >>, Jun. 25, 2008, pp. 3.

* cited by examiner

Primary Examiner — Matthew Zimmerman

(57) ABSTRACT

Data-driven item value determinations for a user-interested topic are automatically generated and made available to a user for rendering effective, efficient decisional choices on one or more aspects of the user-interested topic. Information on components of the user-interested topic relevant to a user's decisional choices are mined from the internet and collated to generate values that identify optimum user choices. User input is utilized to tailor generated value determinations for specific user preferences, issues and/or concerns. Data-driven item value determinations can be generated for a host of user-interested topics including, but not limited to, eating establishment nutritional choices and shopping mall criteria.

20 Claims, 11 Drawing Sheets

METHOD, MEDIUM, AND SYSTEM FOR RANKING DISHES AT EATING ESTABLISHMENTS

BACKGROUND

With access to the internet, or world wide web (www), users today have a plethora of available information that can be used to make informed choices and decisions. Moreover, with the increased technology and sophistication of current mobile devices, e.g., lap top computers, cell phones, smart phones, etc., users can access the internet from myriad locations to acquire data points and help inform their decisions on a variety of issues and matters.

For an example, there are a large number of people today who dine out at a restaurant, fast food joint, food cart, etc., collectively eating establishments, for one or more meals on any given day of a week. And users' health affected by their diet is a significant issue for many of these same people. Weight gain, and indeed obesity, diabetes and various other health issues and illnesses due to or otherwise exacerbated by unhealthy diet choices currently plague many people.

However, many eating establishments do not advertise, or make readily available, nutritional information, e.g., calories, sugar content, etc., for the food they serve. Consequently, users generally face difficulties in trying to ascertain what eating establishments serve healthy dishes, or at any particular eating establishment, which dish(es) are optimum nutritional choices for them. Adding to the issue of a lack of advertised nutritional information is that, generally without legal incentives, such as laws requiring the publication of nutritional information, eating establishments typically do not spend the time to identify and publish their menu's nutritional value. This is generally for a host of reasons, including, e.g., the eating establishment does not want to advertise that their dishes may not be relatively nutritious and eating establishment menus change and it requires time, effort, and expense to update the consequent nutritional data.

As a second example, there are myriad shopping malls in the United States and all over the world, each housing generally a variety of stores. Shoppers may have various choices on which mall to visit and shop at and would find it useful to have at least a subset of malls rated and/or ranked by one or more criteria such as, e.g., average cost of goods sold at a mall's stores, variety of stores and/or goods sold, relative quality of the goods sold at the mall stores, etc. However, this information is not identified and readily available to shoppers, i.e., users. Thus, users must bring their own understanding, which may not be accurate, and a certain amount of luck to selecting a mall that suits any particular shopping excursion needs.

It would be desirable to independently automatically gather information for one or more myriad issues, including the above-identified examples of food nutrition and shopping mall criteria, and analyze the information with other relevant available data to generate decisional data that can be used to support user-informed determinations on an issue. It would further be desirable to utilize the computational and communicative power of a user's mobile device to assist a user to access output created from generated decisional data in a quick, efficient manner with minimal user effort to help effect optimal user determinations.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for enabling a general data-driven item value determinator that mines information from the internet and/or receives scanned and imported information on a topic and generates decisional data that is output to a user for making informed decisions on the topic. In embodiments user-specific information can be utilized to tailor decisional data output to a specific user pursuant to the user's interests, issues, etc.

Embodiments discussed herein further include systems and methodology for enabling an eating establishment nutrition determinator that can locate recipes for menu dishes of various eating establishments on the internet, generate nutritional characteristic values for the menu dish recipes, and score menu dishes based, at least in part, on a dish's generated nutritional characteristic values. In embodiments eating establishments are scored based on their menu dishes' scores. In embodiments eating establishments are also rated and/or ranked, based on an eating establishment's score relative to other eating establishment scores.

In embodiments decisional data, such as menu dish nutritional characteristic values, menu dish scores, and eating establishment scores, are used to generate an output that is displayed for a user to utilize in making informed nutritional eating choices.

Embodiments discussed herein also include systems and methodology for enabling a shopping mall determinator that can generate decisional data on shopping mall stores and shopping malls. In embodiments a shopping mall determinator identifies the stores of various shopping malls, generates, or otherwise identifies, merchandise purchase point values for merchandise sold in mall stores, and scores merchandise sold in a mall store, based at least in part on respective merchandise purchase point values. In embodiments mall stores are scored based on their merchandise scores. In an embodiment shopping malls are scored based on their mall store scores. In embodiments shopping malls are also rated and/or ranked, based on a shopping mall's score relative to other shopping mall scores.

In embodiments decisional data, such as merchandise purchase point values, merchandise scores, mall store scores, and shopping mall scores, are used to generate an output that is displayed for a user to utilize in making informed shopping choices.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
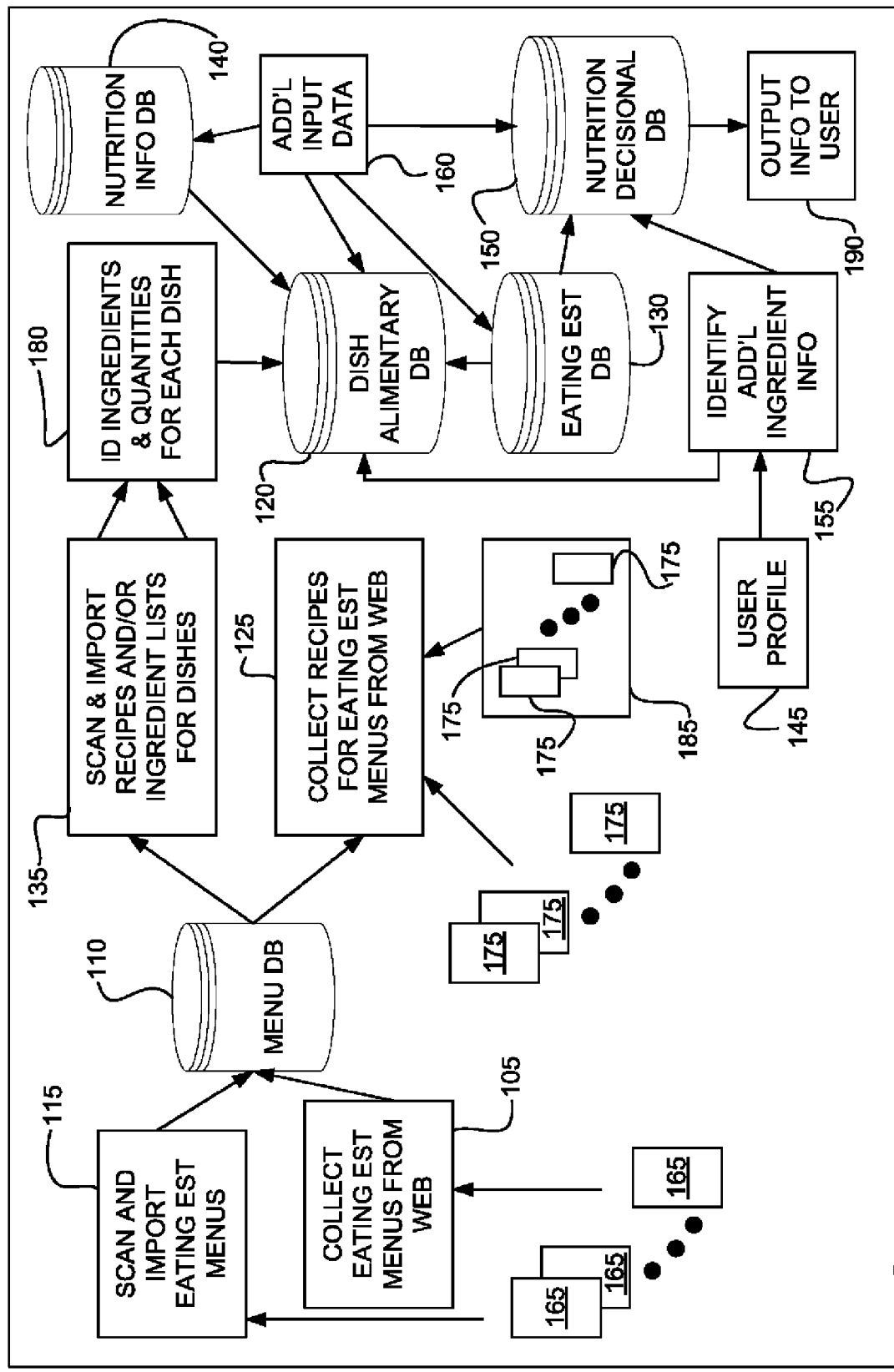
FIG. 1 depicts components and processing flow for an embodiment eating establishment nutrition determinator.

FIG. 1 depicts embodiment components and generalized processing flow for an embodiment specialized data-driven item value determinator 100 for generating decisional data on eating establishment nutrition, also referred to herein as an eating establishment nutrition determinator, or EEND, 100. The embodiment EEND 100 is only one specific embodiment of a generalized data-driven item value determinator discussed below with reference to FIG. 6.

In an embodiment EEND 100 component information, i.e., eating establishment menus 165, is collected, or otherwise mined, from the internet 105. In an embodiment component information, i.e., eating establishment menus 165, is also, or alternatively, scanned and imported from various text inclusive media 115, e.g., books, magazines, physical restaurant menus, etc. The collected eating establishment menus 165 identify the menu items, or dishes, served by their respective eating establishments. In an embodiment the collected eating establishment menus 165 and/or data extracted from them, e.g., the dishes identified in the menus 165, is stored in, or otherwise referenced by, a menu database 110.

In an embodiment eating establishment menus can also be input, e.g., typed in, photographed, etc., 115 by a user or others for access by the EEND 100.

In an embodiment the collected eating establishment menus 165 are chosen based on input from a user, such as, a user profile 145.

In an embodiment a user is prompted, or otherwise provided access, to generate a user profile 145 for assisting the EEND 100 in generating user-pertinent decisional data. In an embodiment the user profile 145 can be updated, enhanced, modified and/or deleted by the user at the user's determination.

In an embodiment a user profile 145 contains information on the user's eating establishment locations of interest, e.g., the user's eating establishment geographical preferences, e.g., the city of Redmond, the state of Washington, within an hour's drive of the user's current location or a user-specified location, etc.

In an embodiment a user profile 145 contains information on the user's eating tastes, e.g., eating establishments that serve breakfast, eating establishments where the user can sit and be served, eating establishments that serve twenty-four hours a day, eating establishments that specialize in soups, etc.

In an embodiment a user profile 145 contains information on the user's dietary preferences, e.g., low in calories, high in vitamin C, low in sugar, no MSG, etc.

In an embodiment a user profile 145 contains information on the user's dietary issues and concerns, e.g., diabetic, a wheat or nut allergy, lactose intolerant, weight issues, etc.

In an embodiment a user profile 145 can contain additional user specific information relevant to assisting in the generation of user-pertinent decisional data, e.g., the user is only interested in eating establishments that serve a user-specified maximum number of people at any one time, the user is interested in eating establishments that only serve dishes made from organic ingredients, the user prefers pasta dishes, etc.

In an alternative embodiment all eating establishment menus 165 that can be mined from the internet 105 and that are scanned and imported and manually entered in, e.g., typed in, photographed, etc., 115 are used to populate the menu database 110.

In other alternative embodiments other schemes are employed for determining the collected eating establishment menus 165, e.g., menus 165 for eating establishments in a geographic region, e.g., Washington state, United States west coast, North America, etc.; menus 165 for eating establishments that serve at least two meals a day, e.g., breakfast and lunch; etc.

Referring again to FIG. 1, in an embodiment information in the menu database 110 is used to collect, or otherwise mine, relevant recipes 175 from the internet 125. In an embodiment the menu items identified in the collected menus 165 represented in the menu database 110, i.e., dishes, are identified and used to collect, or otherwise mine, respective recipes 175 from the internet 125 for the identified dishes. For example, if a dish identified in a collected eating establishment menu 165 is chicken kiev then recipes 175 for chicken kiev are collected, or otherwise mined, from the internet 125.

In an embodiment recipes 175 for dishes identified in collected eating establishment menus 165 are also, or alternatively, scanned and imported from various text inclusive media 135, e.g., books, magazines, handwritten recipes on paper, etc.

In an embodiment ingredients for dishes identified in collected eating establishment menus 165 are also, or alternatively, scanned and imported 135, e.g., from box or can labels for dishes packaged and sold in a store from, or otherwise associated with, the eating establishments, etc.

In an embodiment recipes 175 for dishes identified in collected eating establishment menus 165 can also be input, e.g., typed in, photographed, etc., 135 by a user for access by the EEND 100.

In an embodiment, if the recipe 175 for a specific eating establishment dish is located on the internet 125, scanned and imported 135, etc., then this recipe 175 is the collected recipe 175 for the dish. For example, assume an eating establishment named Yummy has a chicken kiev menu dish and the actual recipe 175 for the chicken kiev served by Yummy is published on the internet. In this embodiment and example the Yummy chicken kiev recipe 175 on the internet is the collected recipe 175 for the Yummy eating establishment chicken kiev menu item.

In an embodiment, if the recipe 175 for a specific eating establishment dish cannot be located then other recipes 175 for the dish are collected, e.g., mined from the internet 125, scanned and imported 135, etc. In an embodiment a maximum predetermined number, e.g., one, three, five, etc., of recipes 175 for a menu item whose eating establishment recipe 175 cannot be located are collected and used as a recipe set 185 by the EEND 100.

In an embodiment the recipes 175 of a recipe set 185 are chosen based on predetermined criteria including, but not limited to, the recipes 175 with the most user search hits on the internet, the recipes 175 with the highest user ratings, the recipes with the least number of ingredients, the recipes with the most number of ingredients, the first recipe set 185 number of recipes 175 collected, etc.

In an embodiment each collected recipe 175 for a menu dish is parsed and its ingredients and their quantities are identified 180.

In an embodiment where a recipe set 185 contains just one recipe 175 for a menu dish then the one recipe 175 in the recipe set 185 is parsed and its ingredients and their quantities are identified 180.

In an embodiment where a recipe set 185 contains two or more recipes 175, also referred to herein as a multi recipe set 185, then the recipe set 185 is analyzed and a list of ingredients and quantities for each recipe set 185, i.e., collection of two or more recipes 175, is determined 180. In embodiments various schemes can be used to determine the representative list of ingredients and quantities 180 for a multi recipe set 185.

Figure 2:
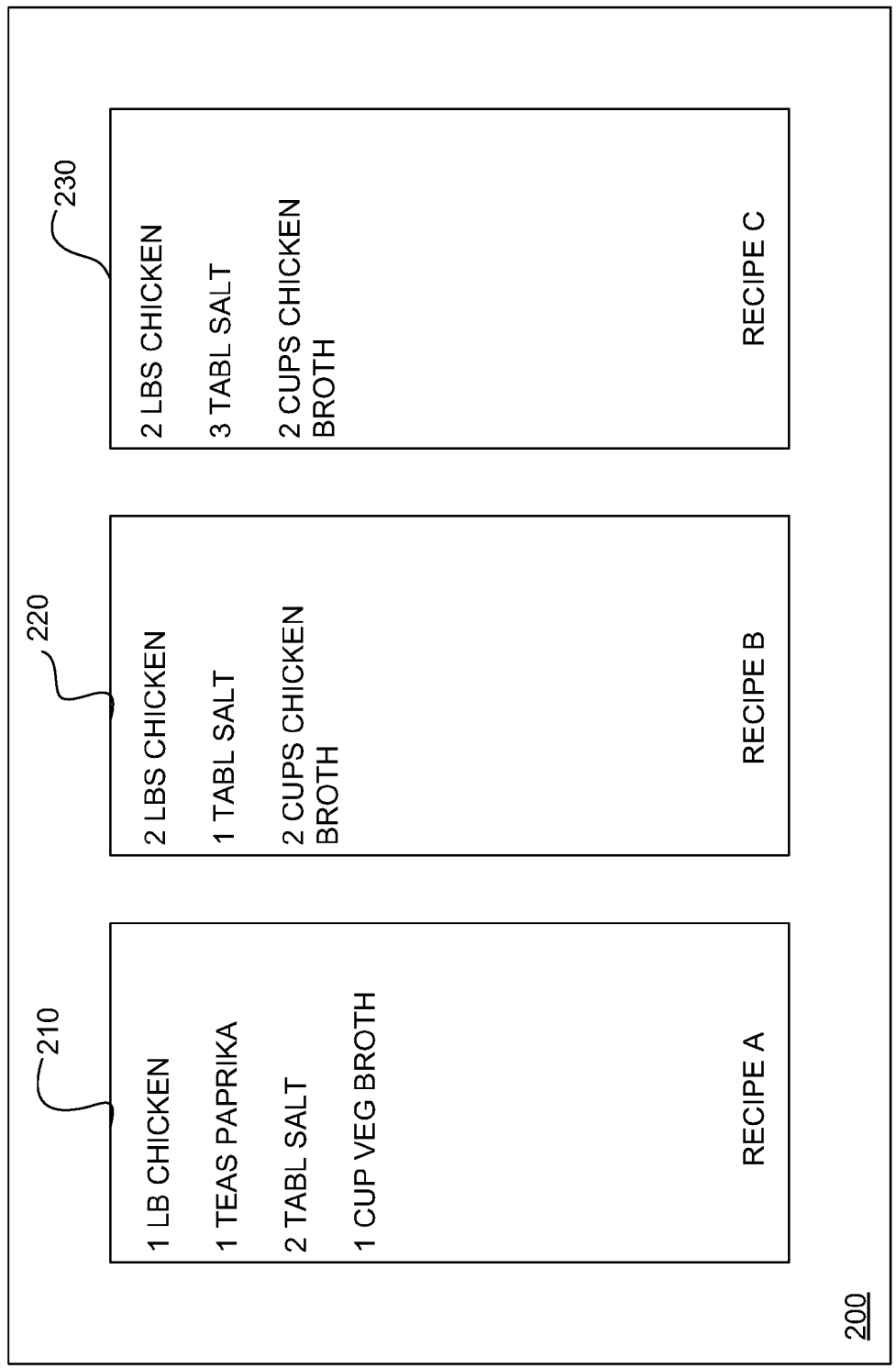
FIG. 2 depicts exemplary recipes in a multi-recipe set for an eating establishment menu item.

In one embodiment all the ingredients from each recipe 175 in a multi recipe set 185 and the largest identified quantity of each ingredient are included 180 in the determined list of ingredients and quantities thereof. For example, and referring to FIG. 2, assume three recipes 175 for chicken kiev are included in a multi recipe set 200: recipe A 210, recipe B 220 and recipe C 230. In this example recipe A 210 calls for one pound of chicken, one teaspoon paprika, two tablespoons of salt and one cup of vegetable broth. In this example recipe B 220 calls for two pounds of chicken, one tablespoon salt and two cups of chicken broth. In this example recipe C 230 calls for two pound of chicken, three tablespoons of salt and one cup of chicken broth. In this embodiment and with reference to the example depicted in FIG. 2, the list of ingredients and quantities thereof determined 180 for the recipe set 200 of chicken kiev will include two pounds of chicken, a teaspoon of paprika, three tablespoons of salt, two cups of chicken broth and one cup of vegetable broth.

In a second embodiment the ingredients that are identified in the majority of recipes 175 in a multi recipe set 185 and the average ingredient quantities are included 180 in the determined list of ingredients and quantities thereof. Again using the example of the three recipes A 210, B 220 and C 230 of FIG. 2 and this second embodiment the list of ingredients and quantities thereof determined for the recipe set 200 for chicken kiev will include one-and-two-thirds pounds of chicken, two tablespoons of salt, and one and one-third cups of chicken broth.

In a third embodiment the ingredients that are identified in the majority of recipes 175 in a multi recipe set 185 and the largest called for quantity of each of these ingredients are included 180 in the determined list of ingredients and quantities thereof. Once again, referring to the example of the three recipes A 210, B 220 and C 230 of FIG. 2 and this third embodiment the list of ingredients and quantities thereof determined for the recipe set 200 for chicken kiev will include two pounds of chicken, three tablespoons salt, and two cups of chicken broth.

There are a plethora of additional schemes that can be employed to determine the list of ingredients and quantities 180 for a multi recipe set 185 and in various other embodiments one or a combination of two or more of schemes are employed.

Referring again to FIG. 1, the embodiment EEND 100 has, or otherwise has access to, a database, or databases, of nutritional values 140, referred to herein collectively as a nutrition info database 140, for a multitude of ingredients found in the collected recipes 175 and recipe sets 185. In an embodiment the nutrition info database 140 contains the calorie count for each represented ingredient. In an embodiment the nutrition info database 140 contains a value representing the sugar content for each represented ingredient. In an embodiment the nutrition info database 140 contains the grams of fat for each represented ingredient. In embodiments additional nutritional characteristic values are included for each represented ingredient in the nutrition info database 140, e.g., the vitamins in each ingredient, etc.

In an embodiment the nutrition info database 140 also, or alternatively, contains nutritional characteristic values for menu item recipes, e.g., the calorie count for a menu item recipe, the sugar content for a menu item recipe, the grams of fat for a menu item recipe, etc.

In an embodiment the nutrition info database 140 has been previously generated and is accessed by the embodiment EEND 100. In an alternative embodiment the nutrition info database 140 is generated by an embodiment EEND 100. In an aspect of this alternative embodiment the nutrition info database 140 is populated with relevant nutritional characteristic values mined from the internet, scanned and imported in from various text inclusive media and/or inputted, e.g., typed in, photographed, etc., by the user and/or others.

In an embodiment the EEND 100 can update, enhance, modify or otherwise alter the nutrition info database 140. In an alternative embodiment the EEND 100 generates a copy, or version, of the nutrition info database 140 that the EEND 100 can then update, enhance, modify or otherwise alter.

In an embodiment the determined list of ingredients and quantities thereof 180 for each collected recipe 175 or recipe set 185 and values in the nutrition info database 140 are used to generate one or more dish alimentary values for each dish identified in a menu 165 represented in the menu database 110. In an embodiment generated dish alimentary values are stored in, or otherwise accessed by, one or more dish alimentary databases, collectively referred to herein as a dish alimentary database 120.

In an embodiment a dish alimentary value is calculated for each menu dish for each nutritional characteristic value, e.g., calories, grams of fat, etc., represented in the nutrition info database 140. Assume for example that the nutrition info database 140 contains a caloric count value, a sugar content value and a fat gram value for each ingredient represented therein. In this embodiment and example a caloric count, a sugar content value and the number of grams of fat is generated from the dish's recipe's determined list of ingredients and quantities thereof 180 and values in the nutrition info database 140 for each menu dish and stored in the dish alimentary database 120.

As a second example, assume that the nutrition info database 140 contains a caloric count value, a sugar content value and a fat gram value for one or more menu item recipes 175 and/or recipe sets 185. In this embodiment and second example a caloric count, a sugar content value and the number of grams of fat is generated from the menu item recipes 175 and recipe sets 185, and/or data therein, and values in the nutrition info database 140 for each menu dish represented in the nutrition info database 140 and the generated dish alimentary values are stored in the dish alimentary database 120.

In an embodiment a dish nutrition score is calculated for each dish for each menu 165 represented in the menu database 110. In an embodiment the dish nutrition score is an identification of a dish's nutrition, e.g., on a scale from one to ten, with one being the least nutritious and ten being the most nutritious. In an embodiment a dish nutrition score is based on one or more nutritional characteristic values for the ingredients and quantities thereof in a dish and/or one or more nutritional characteristic values for the recipe 175 for the dish. In an embodiment a dish nutrition score provides a relative value of a dish's nutrition compared to other dishes scored by the EEND 100.

In an embodiment generated dish nutrition scores are saved in, or otherwise accessible by, one or more nutrition decisional databases, collectively referred to herein as a nutrition decisional database 150.

In an embodiment dish nutrition scores can be generated on the fly, when, e.g., prompted by the user for eating establishment decisional information.

In an alternative embodiment where there are one or more multi recipe sets 185, a dish alimentary value is calculated for each nutritional characteristic value, e.g., calories, grams of fat, etc., represented in the nutrition info database 140 for each recipe 175 in the multi recipe set 185. Assume, for example, that the nutrition info database 140 contains a caloric count value, a sugar content value and a fat gram value for each ingredient represented therein. Referring again to the example of FIG. 2, there are three recipes, A 210, B 220 and C 230, for a multi recipe set 200 for a chicken kiev menu item. In this alternative embodiment and example a caloric count, a sugar content value and the number of grams of fat is generated from the determined list of ingredients and quantities thereof and values in the nutrition info database 140 for each of the three recipes 175 for chicken kiev in the multi recipe set 200. Thus, in this alternative embodiment and example a caloric count, a sugar content value and the number of grams of fat is determined for each of recipe A 210, recipe B 220 and recipe C 230 of FIG. 2.

In another aspect of this embodiment, where the nutrition info database 140 contains nutritional characteristic values for recipes 175 for menu items, e.g., calories for a recipe 175 for chicken kiev, grams of fat for a recipe 175 for chicken kiev, etc., a dish alimentary value, e.g., caloric count, grams of fat, etc., is generated from the recipe nutritional characteristic values for each recipe 175 in a multi recipe set 185. Thus, referring again to the example of FIG. 2, if the nutrition info database 140 contains nutritional characteristic values for each of the three chicken kiev recipes A 210, B 220 and C 230 then the appropriate nutritional characteristic values are identified and stored as respective dish alimentary values in the dish alimentary database 120 for each of the three recipes 175.

In this alternative embodiment one recipe 175 of a multi recipe set 185 is identified to be the representative recipe 175 for the respective menu dish. In an aspect of this alternative embodiment the recipe 175 of the multi recipe set 185 with the largest calculated dish alimentary values is identified to be the representative recipe 175 for the respective menu dish. In a second aspect of this alternative embodiment the recipe 175 of the multi recipe set 185 with the largest of one particular dish alimentary value, e.g., the largest caloric count, the largest number of grams of fat, etc., is identified to be the representative recipe 175 for the respective menu dish. In still other aspects of this alternative embodiment other criteria are used to identify the representative recipe 175 for a menu dish from a multi recipe set 185, e.g., the recipe 175 with the smallest calculated dish alimentary values, etc.

As noted, in an embodiment a dish nutrition score is calculated for each dish for each menu 165 represented in the menu database 110. In an alternative embodiment where there are one or more multi recipe sets 185 a dish nutrition score is calculated for each recipe 175 in each multi recipe set 185.

In this alternative embodiment a recipe 175 of the multi recipe set 185 is selected to be the representative recipe 175 for the respective menu dish based on the dish nutrition scores calculated for each recipe 175 in the multi recipe set 185. In an aspect of this alternative embodiment the recipe 175 of the multi recipe set 185 with the optimum dish nutrition score is identified to be the representative recipe 175 for the respective menu dish. In a second aspect of this alternative embodiment the recipe 175 of the multi recipe set 185 with the worst dish nutrition score is identified to be the representative recipe 175 for the respective menu dish. In still other aspects of this alternative embodiment other criteria are used in conjunction with the calculated dish nutrition scores for the recipes 175 of a multi recipe set 185 to identify the representative recipe 175 for a menu dish, e.g., the recipe 175 with the average or closest to average dish nutrition score, etc.

In an embodiment a user profile 145 created, or otherwise populated, by a user is accessed to identify additional ingredient, dish and/or eating establishment information 155 that can prove pertinent to generating relevant decisional data on the dishes served by an eating establishment and/or the choice of eating establishments. For example, a user profile 145 can indicate that the user has a nut allergy. This information can be collated with the identified ingredients in the representative recipes 175 for the menu dishes for an eating establishment that the user is currently at to provide decisional data on which dishes include nuts and should, therefore, be avoided by the user. As another example, a user profile 145 can indicate that the user desires dishes with a maximum of four hundred calories. This caloric information can be collated with information in the dish alimentary database 120 for the menu dishes for an eating establishment that the user is currently at to provide decisional data on which dishes the user should choose and/or which dishes the user should not order.

In an embodiment information from a user profile 145 is collated with nutritional characteristic values stored in the nutrition info database 140, identified ingredients and quantities thereof for recipes 175 for menu dishes represented in the menu database 110 and/or other eating establishment information stored in an eating establishment database(s) 130 and the results are stored as additional dish alimentary values or alimentary dish data in the dish alimentary database 120.

In this embodiment the eating establishment database(s) 130 contains information on eating establishments that are being scored by the embodiment EEND 100, e.g., an eating establishment is open twenty-four hours, an eating establishment serves only vegetarian food, an eating establishment serves breakfast, lunch and dinner, and eating establishment serves only dishes made from organic ingredients, etc.

For example, in an aspect of this embodiment the fact that a user profile 145 identifies a user nut allergy is collated with an identified nut ingredient in a recipe 175 for a menu dish and used to generate an allergy dish alimentary value, e.g., ten out of ten, for the respective menu dish.

As another example, in an aspect of this embodiment a user's desire for an eating establishment that serves food twenty-four hours a day is collated with information in the eating establishment database 130 that an eating establishment is open twenty-four hours a day to generate a preferred dish alimentary value, e.g., ten out of ten, for each menu dish for the respective eating establishment.

In an embodiment information from a user profile 145 is used to modify a dish's nutrition score for the particular user. For example, assume a menu dish has initially been generated a relatively good dish nutrition score by the embodiment EEND 100 based on the dish's calories, grams of fat, and/or other dish alimentary values calculated, or otherwise identified, for its representative recipe 175. In this example, also assume that the dish contains nuts and the user profile 145 indicates a nut allergy. In this embodiment and example the information in the user profile 145 identifying the nut allergy is utilized to modify the dish nutrition score such that the new score is a bad, e.g., very low, or lowest, score.

In an embodiment dish nutrition scores are used to rate and/or rank the dishes for an eating establishment. In an embodiment generated dish ratings and rankings are stored as decisional data in the nutrition decisional database 150.

In an embodiment dish nutrition scores are used to generate an eating establishment score for the respective eating establishment. In one embodiment a generated eating establishment score is the average of the dish nutrition scores for the dishes of the eating establishment menu 165. In another embodiment a generated eating establishment score is the lowest of the dish nutrition scores for the eating establishment dishes. In other embodiments other selection criteria and/or formulas are used to generate an eating establishment score, e.g., the highest of the dish nutrition scores for the eating establishment dishes, the mean of the dish nutrition scores for the eating establishment dishes, the average of the dish nutrition scores for the eating establishment dishes weighted by a value related to the distance the eating establishment is from the user's current location, etc.

In an embodiment eating establishment scores can be generated on the fly when, e.g., prompted by the user for eating establishment decisional information, and/or stored in the nutrition decisional database 150.

In an embodiment eating establishment scores are used to rate and/or rank eating establishments. In an embodiment generated eating establishment ratings and rankings are stored as decisional data in the nutrition decisional database 150.

In an embodiment decisional data generated from values in the dish alimentary database 120 and/or information in the user profile 145 is stored in, or otherwise accessible by, the nutrition decisional database 150.

In an embodiment decisional data stored in, or otherwise accessed by, the nutrition decisional database 150 and which can be presented to a user is any information that is accessible to and/or generated by the EEND 100 and includes dish alimentary values, e.g., calories in a dish, number of grams of fat in a dish, etc., user-pertinent dish ingredient info, e.g., identification that a dish contains nuts, wheat, etc., dish nutrition scores, dish ratings, dish rankings, eating establishment scores, eating establishment ratings, eating establishment rankings, etc., or any combinations thereof.

In an embodiment stored decisional data in the nutrition decisional database 150 is presented to the user 190 to inform the user and assist the user in choosing an eating establishment and/or menu items in any particular eating establishment. In an aspect of this embodiment stored decisional data is used to generate an output to be displayed to a user that informs the user on eating establishment choices and/or menu item choices for any particular eating establishment 190.

In an embodiment stored decisional data is used to generate an augmented reality output display for a user on their computing and/or mobile device. Computing devices include devices with a processor that has the capability to execute software applications, or computer programs, i.e., execute software instructions or computer code. Examples of computing devices include, but are not limited to, computers, e.g., desktop computers, computer laptops, also referred to herein as laptops, notebooks, etc.; smart phones; etc. Examples of mobile devices include, but are not limited to, mobile computers, e.g., laptops, etc.; cell phones; smart phones; cameras; etc.

In an embodiment a user can utilize their mobile device to take a picture, or otherwise scan or import, the menu 165 of an eating establishment 115. In alternative embodiments a picture, or view, of the menu 165 of an eating establishment is obtained in other manners, e.g., accessed on the internet 125, etc.

In embodiments optical character recognition, OCR, or image recognition technologies are employed to generate a display of an eating establishment menu 165 on the user's mobile device.

Figure 3:
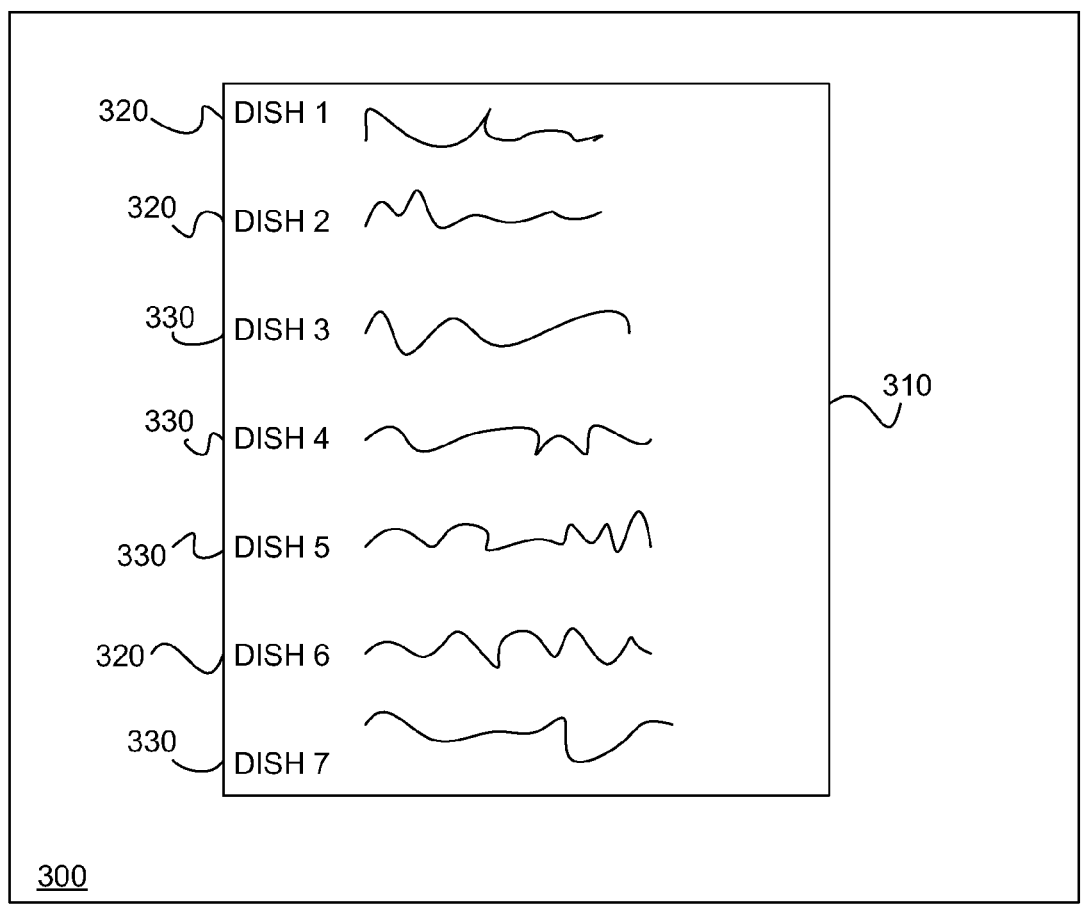
FIG. 3 depicts an embodiment of an exemplary augmented reality display output to a user for an embodiment eating establishment nutrition determinator.

As noted, in an embodiment stored decisional data is used to generate an augmented reality output display for a user on their computing and/or mobile device. In an aspect of this embodiment stored decisional data in the nutrition decisional database 150 is used to generate an augmented reality display overlaid on an eating establishment menu display output by the user's mobile device. An example of a user mobile device output 300 of an augmented reality display overlaid on an eating establishment menu display is shown in FIG. 3. In this embodiment and the example of FIG. 3, the dishes identified on an exemplary eating establishment menu 310 that a user can choose 320, based on decisional data in the nutrition decisional database 150 for the eating establishment menu 310, are augmented in one manner. In this embodiment and the example of FIG. 3 the dishes identified on the exemplary eating establishment menu 310 that a user will likely wish to avoid 330, based again on decisional data in the nutrition decisional database 150 for the eating establishment menu 310, are augmented in a different manner.

In one aspect of this embodiment and the example of FIG. 3 the augmented reality display can show alternative hue highlighting for both dishes on a menu 310 that the user could order 320 and dishes on the menu 310 the user will likely wish to avoid 330, e.g., dishes the user could order 320 are highlighted green on the user's mobile device output 300 and dishes the user will likely wish to avoid 330 are highlighted red.

In a second aspect of this embodiment and the example of FIG. 3, the augmented reality display can treat the dishes on the displayed menu 310 that the user will likely wish to avoid 330 by deleting them from the display 300, blacking them out on the display 300, crossing them out on the display 300, etc.

In other aspects of this embodiment the augmented reality display overlaid on an eating establishment menu display can include a variety of treatments, e.g., using one font and/or font color for dishes a user can order and a second font and/or font color for dishes a user will likely wish to avoid; using a larger font size for dishes a user can order and a smaller font size for dishes a user will likely wish to avoid, etc.

As previously noted, in an embodiment menu dishes and eating establishments are rated and/or ranked. In an embodiment generated ratings or rankings for either menu dishes or eating establishments is output, or otherwise identified, to the user, e.g., via the user's mobile device display screen.

In an aspect of this embodiment menu dish rankings are identified by an augmented reality display, or treatment, overlaid on the corresponding eating establishment menu display. For example, a star system can be effected overlaid on a menu display to identify the corresponding dish rankings; e.g., the dish with the highest ranking has the most stars pictured next to it and the dish with the lowest ranking has no stars pictured next to it, etc. As other examples, highlighting can be used to identify higher ranked dishes, alternative highlighting hues can be used to identify higher ranked dishes and lower ranked dishes, bolding can be used to identify higher ranked dishes, etc.

In an aspect of this embodiment, a ranking of a set, or subset, of eating establishments with menus 165 represented in the menu database 110 is output to the user as a list with, e.g., the order of eating establishments identifying their relative ranking, e.g., from highest rank to lowest; a treatment identifying their relative ranking, e.g., higher ranked eating establishments highlighted in green, identified in green font, etc., lower ranked eating establishments highlighted in an alternative hue, e.g., red, identified in red font, etc.; with the eating establishment ranking accompanying the list of eating establishments ordered alphabetically, geographically, e.g., from nearest to farthest from the user's current location, etc.; etc.

In other aspects of this embodiment a ranking of a set, or subset, of eating establishments with menus 165 represented in the menu database 110 is output to the user in a variety of other, or other combinations of, formats, e.g., identified on a map display accompanied by their ranking; formatted in a table that includes, e.g., an identification of the eating establishment, the eating establishment location, the eating establishment food category, e.g., American, Italian, German, etc., the eating establishment ranking, and/or additional and/or other combinations of information; etc.

In yet other aspects of this embodiment a ranking of a set, or subset, or eating establishments with menus 165 represented in the menu database 110 is identified by a display that identifies only a subset of the highest ranked eating establishments, e.g., the top ten ranked eating establishments, the eating establishments ranked in the top twenty-five percent, etc.

In an embodiment a user, or others, can add additional input data 160 into the EEND 100 that can thereafter be used to render modifications to dish alimentary values stored in the dish alimentary database 120 and/or decisional data stored in the nutrition decisional database 150. In an embodiment and example, the user may discover that while an eating establishment menu 165 lists a particular dish, e.g., macaroni and cheese, the eating establishment no longer serves this dish. In this embodiment and example the user, or others, e.g., the eating establishment owner, the eating establishment chef, etc., can add this information to the EEND 100 and data in the dish alimentary database 120 and/or nutrition decisional database 150 will be updated, or otherwise modified, accordingly.

For example, all dish alimentary values and references to the macaroni and cheese dish for the eating establishment can be deleted, so that the macaroni and cheese dish no longer exists for the eating establishment in the EEND 100. In an aspect of this embodiment the resultant output display for the eating establishment menu can be modified so that it no longer identifies macaroni and cheese as a menu item.

As another example in this embodiment, a restaurant chef may discover that the calories identified for a dish from the chef's eating establishment are in error and can modify this data accordingly, by, e.g., inputting the correct calories for the dish to the EEND 100, modifying the recipe for the dish utilized by the EEND 100 so that it correctly identifies the dish's recipe, which in turn, will cause the subsequent generated calorie count to be accurately modified, etc.

In an embodiment the EEND 100 allows a user to tailor the decisional data to the current information available and a user's preferences, tastes, issues, etc.

As previously noted, the embodiment EEND 100 is only one specific embodiment of a generalized data-driven item value determinator discussed below with reference to FIG. 6. Another example of a specific embodiment data-driven item value determinator is an embodiment shopping mall determinator 400, also referred to herein as an embodiment SMD 400, illustrated in FIG. 4.

Figure 4:
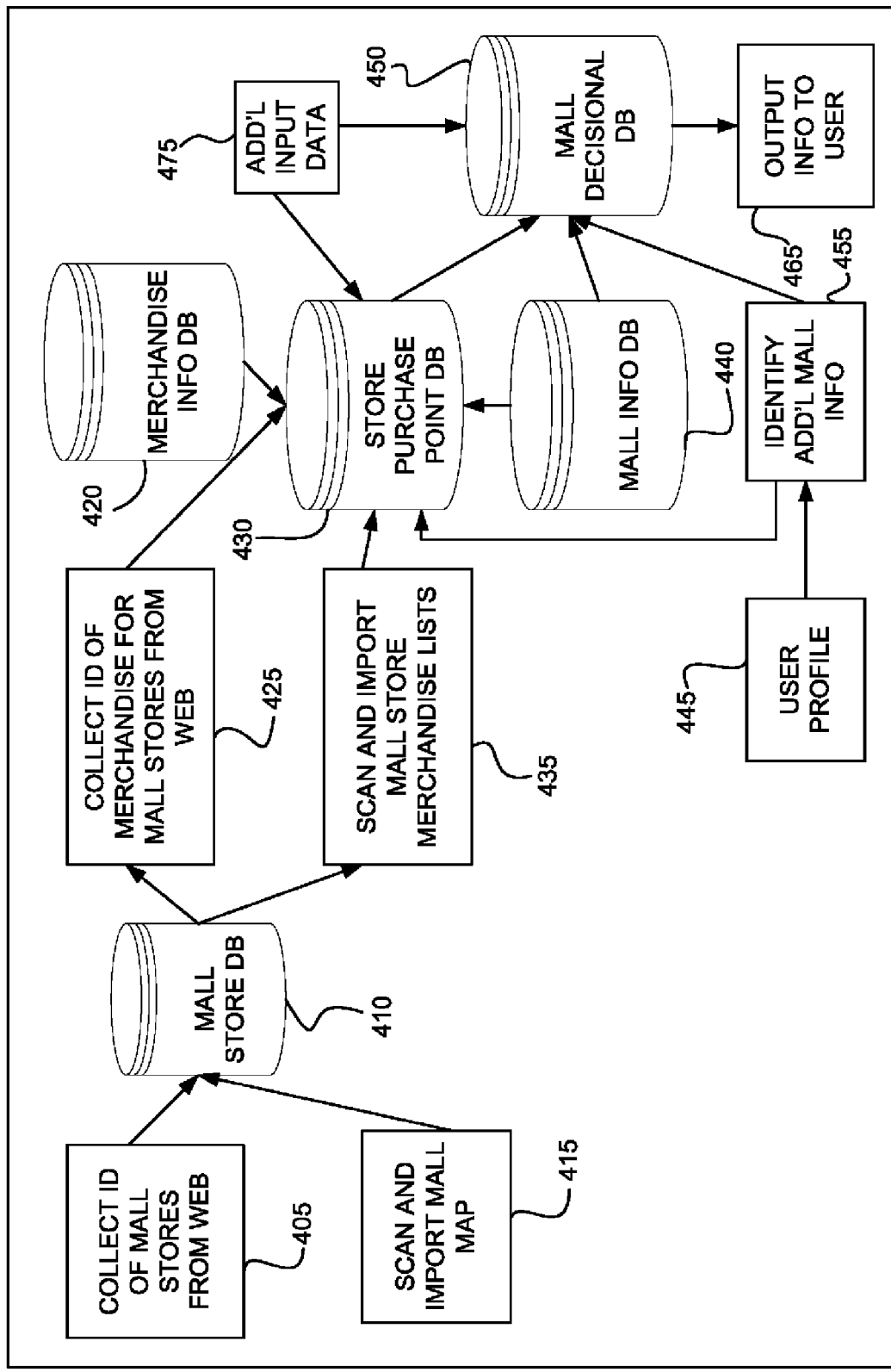
FIG. 4 depicts components and processing flow for an embodiment shopping mall determinator.

Referring to FIG. 4 a components and generalized processing flow for generating decisional data on shopping malls is illustrated for an embodiment SMD 400.

In an embodiment SMD 400 component information, i.e., an identification of the stores of a mall, is collected, or otherwise mined, from the internet 405. In an embodiment component information, i.e., an identification of the stores of a mall, is also, or alternatively, scanned and imported from various text inclusive media 415, e.g., a mall map, a mall directory, pamphlet, magazine, etc. In an embodiment identification of the stores of a shopping mall can also be input, e.g., typed in, photographed, etc., 415 by a user or others for access by the SMD 400.

In an embodiment the identity of the stores of a shopping mall are stored in, or otherwise referenced or accessed by, one or more mall store databases collectively referred to herein as a mall store database 410.

In an embodiment the shopping malls for which store identification information is collected for populating the mall store database 410 are chosen based on input from a user, such as, a user profile 445.

In an embodiment a user is prompted, or otherwise provided access, to generate a user profile 445 for assisting the SMD 400 in generating user-pertinent decisional data. In an embodiment the user profile 445 can be updated, enhanced, modified and/or deleted by the user at the user's determination.

In an embodiment a user profile 445 contains information on the user's shopping mall locations of interest, e.g., the user's shopping geographical preferences, e.g., the city of Redmond, the state of Washington, within an hour's drive of the user's current location or a user-specified location, etc.

In an embodiment a user profile 145 contains information on the user's store tastes, e.g., stores that specialize in or carry designer clothes, stores that sell kitchen items, general merchandise stores, specialty stores, etc.

In an embodiment a user profile 445 contains information on the user's shopping issues and concerns, e.g., stores that carry green products, i.e., environmentally sound, or conscious, products, stores whose average merchandise cost is no more than a user-specified dollar amount, etc.

In an embodiment a user profile 445 can contain additional user specific information relevant to assisting in the generation of user-pertinent decisional data, e.g., the user is only interested in stores that are open after eight o'clock p.m., the user is only interested in stores that have a restaurant within the store or within proximity to the store, etc.

In an alternative embodiment all the shopping malls for which information on the stores that are included therein that can be mined from the internet 405 and all the shopping malls for which store identification information is scanned and imported 415 or entered in, e.g., typed in, photographed, etc., 415 for use by the SMD 400 are used to populate the mall store database 410.

In other alternative embodiments other schemes are employed for determining the shopping malls and identification of stores therein for which information thereon is used to populate the mall store database 410, e.g., shopping malls in a geographic region, e.g., Washington state, the United States, North America, etc.; shopping malls with a predefined minimum number of stores; shopping malls with a predefined maximum number of stores; shopping malls that include at least one eating establishment on the premises; etc.

Referring again to FIG. 4, in an embodiment information in the mall store database 410 is used to collect, or otherwise mine, from the internet 425 the identification of merchandise sold in the stores of a particular mall.

In an embodiment the identification of the merchandise sold by a mall store represented in the mall store database 410 is also, or alternatively, scanned and imported from various text inclusive media 435, e.g., magazines, store merchandise lists, etc.

In an embodiment the identification of the merchandise sold by a mall store represented in the mall store database 410 can also be input, e.g., typed in, photographed, etc., 435 by a user or others for access by the SMD 400.

In an embodiment, if the identification of the merchandise sold at a first particular store in a first particular mall cannot be located, but the merchandise sold at a same named second store in a different, second, mall is available to the SMD 400.

In an aspect of this embodiment, if the merchandise sold at a first particular store in a first particular mall cannot be identified, but the merchandise sold at two or more same named stores in other malls is available to the SMD 400 then the identified merchandise for the same named store in the mall that is geographically the closest in proximity to the first particular mall will be used for the identification of merchandise sold at the first store. Thus for example in this aspect of the embodiment assume there is a store A in twenty different malls, the identification of merchandise sold by store A in a first mall cannot be located, the merchandise sold in a second store A in a second mall has been mined from the internet 425 and is available to the SMD 400, the merchandise sold in a third store A in a third mall is available to the SMD 400, and the merchandise sold in a forth store A in a forth mall is also available to the SMD 400. Also assume for this embodiment and example that the third mall is in closer geographical proximity to the first mall then either the second mall or the fourth mall. In this aspect of the embodiment and this example the merchandise identified for the third store A in the third mall will also be used as the merchandise identified for the first store A in the first mall.

In other aspects of this embodiment, where the merchandise sold at a first store in a first mall cannot be identified but the merchandise sold at two or more same named stores in other malls is available to the SMD 400, other criteria for determining which same named store identified merchandise will be used as the identified merchandise for the first store is employed, e.g., all merchandise from all same named stores is used as the identified merchandise for the first store in the first mall, etc.

Referring again to FIG. 4, the embodiment SMD 400 has, or otherwise has access to, one or more databases of purchase point information for merchandise sold at stores 420, also referred to herein collectively as a merchandise info database 420. In an embodiment the merchandise info database 420 contains the sales price of the merchandise sold at a particular store. In an embodiment the merchandise info database 420 contains a quality value of the merchandise sold at a particular store; e.g., a quality value of one indicates very low quality and a quality value of ten indicates very high quality, etc. In an embodiment the merchandise info database 420 contains a cost of goods sold value for the merchandise sold at a particular store, which is the price the store paid to purchase the merchandise for sale to consumers. In an embodiment the merchandise info database 420 identifies the merchandise generation location, i.e., where the merchandise was made, e.g., U.S., Canada, etc. In embodiments additional merchandise purchase point values are included for each represented merchandise in the merchandise info database 420, e.g., an indication of whether the merchandise is a green, i.e., environmental, product, an indication of whether the merchandise was made from an animal, the sizes of the available merchandise for sale, etc.

In an embodiment the merchandise info database 420 has been previously generated and is accessed by the embodiment SMD 400. In an alternative embodiment the merchandise info database 420 is generated by an embodiment SMD 400. In an aspect of this alternative embodiment the merchandise info database 420 is populated with relevant merchandise purchase point values mined from the internet, scanned and imported in from various text inclusive media and/or inputted, e.g., typed in, photographed, etc., by the user or others.

In an embodiment the SMD 400 can update, enhance, modify or otherwise alter the merchandise info database 420. In an alternative embodiment the SMD 400 generates a copy, or version, of an existing merchandise info database 420 that the SMD 400 can then update, enhance, modify or otherwise alter.

In an embodiment the identified merchandise for a mall store and the merchandise info database 420 are used to identify and/or generate values for one or more databases of one or more mall store purchase point values 430, collectively referred to herein as a store purchase point database 430, for each mall store represented in the mall store database 410.

In an embodiment a mall store purchase point value is identified and/or generated, or calculated, for each merchandise purchase point value, e.g., sales price, quality, cost of goods sold, etc., represented in the merchandise info database 420. Assume for example that the merchandise info database 420 contains a sales price value, a quality value and a cost of goods sold value for each merchandise item represented therein. In this embodiment and example a sales price, a quality value and a cost of goods sold value is identified for the merchandise for a mall store from the merchandise info database 420 for each merchandise item sold in a particular mall store and stored in the store purchase point database 430.

In an embodiment a mall store purchase point value is generated for each merchandise purchase point value for each mall store represented in the mall store database 410. Assume for example that there are merchandise purchase point values for sales price, quality and cost of goods sold for each merchandise item represented in the merchandise info database 420. In this embodiment and example a sales price value, a quality value and a cost of goods sold value is generated for each mall store. In an aspect of this embodiment and example the merchandise purchase point values generated for a mall store are the average of the merchandise purchase point values identified for the merchandise sold in the respective store. In a second aspect of this embodiment the merchandise purchase point values generated for a mall store are the largest merchandise purchase point values identified for any one merchandise item sold by the store. In other aspects of this embodiment other selection criteria and/or formulas are used to generate merchandise purchase point values for mall stores, e.g., the smallest merchandise purchase point values identified for any merchandise item sold by the store, the mean of the merchandise purchase point values identified for the merchandise sold in the store, etc.

In an embodiment a mall purchase point value is generated for each merchandise purchase point value for each mall represented in the mall store database 410. Assume for example that there is a merchandise purchase point value for sales price, quality and cost of goods sold for each merchandise item represented in the merchandise info database 420. In this embodiment and example a sales price value, a quality value and a cost of goods sold value is generated for each mall. In an aspect of this embodiment and example the merchandise purchase point values generated for a mall are the average of the merchandise purchase point values generated for the mall's stores. In a second aspect of this embodiment the merchandise purchase point values generated for a mall are the largest merchandise purchase point values generated for any of the mall's stores. In other aspects of this embodiment other selection criteria and/or formulas are used to generate merchandise purchase point values for malls, e.g., the smallest merchandise purchase point values generated for any of the mall's stores, the mean of the merchandise purchase point values generated for the mall's stores, etc.

In an embodiment a mall store merchandise score is calculated for each merchandise item sold in each mall store represented in the mall store database 410. In an embodiment the mall store merchandise score is a value deterministic of a mall store's merchandise value, e.g., on a scale from one to ten, with one being the least value for the cost and ten being the most value for the cost.

In an embodiment generated mall store merchandise scores are stored in a mall decisional database 450.

In an embodiment a user profile 445 created, or otherwise populated, by a user is accessed to identify additional information 455 that can prove pertinent to generating relevant decisional data on merchandise sold by a mall store and/or the choice of mall stores and/or malls for a user to shop at. For example, a user profile 445 can indicate that the user is only interested in designer clothing merchandise. This information can be collated with the merchandise sold at a mall store the user is currently shopping at to provide decisional data on the clothing merchandise the user will likely want to consider and the clothing merchandise the user is likely not to be interested in. As another example, a user profile 445 can indicate that the user will only pay a maximum of fifty dollars for any one merchandise item. This sale price information can be collated with information in the store purchase point database 430 for the merchandise being sold at the mall store the user is currently shopping in to provide decisional data on which merchandise the user will likely want to consider purchasing and the merchandise that is more costly than what the user desires to pay.

In an embodiment information from a user profile 445 is collated with mall store purchase point values stored in the store purchase point database 430 and/or other mall information stored in a mall info database 440 and the results are stored as additional mall store purchase point values or mall store info in the store purchase point database 430 and/or as decisional data in the mall decisional database 450.

In an embodiment the mall info database 440 contains information on malls that are being scored by the embodiment SMD 400, e.g., a mall has x number of stores, a mall has a food court, a mall has x number of clothing stores, a mall is two stories, etc.

In an embodiment, and as an example of the use of information in the mall info database 440, a user preference identified in the user profile 445 for a mall that has at least fifty stores is collated with information in the mall info database 440 that a mall has one hundred stores to generate a preferred mall store purchase point value, e.g., ten out of ten, for the respective mall and for each store in the respective mall.

In an embodiment information from a user profile 445 is used to modify a mall store merchandise score for a particular user. For example, assume a merchandise item for a mall store, e.g., a woman's skirt, has initially been generated a high mall store merchandise score by the embodiment SMD 400, e.g., nine (9) out of a possible ten (10), based on the skirt's sales price, assigned quality value, cost of the skirt to the mall store and/or other mall store purchase point values identified, or otherwise generated or calculated, for the skirt. In this example also assume that the skirt costs five hundred dollars and the user profile 445 indicates the user is only willing to spend a maximum of two hundred dollars for any one merchandise item. In this embodiment and example the information in the user profile 445 identifying the maximum cost the user is willing to pay is utilized to modify the woman's skirt mall store merchandise score such that the new score is a less optimum, or even bad, e.g., low, or lowest, score, e.g., the score is lowered from nine (9) out of ten (10) to one (1) out of ten (10).

In an embodiment mall store merchandise scores in the mall decisional database 450 are used to rate and/or rank the merchandise for a mall store. In an embodiment a mall store merchandise rating or ranking rates or ranks the merchandise sold at a mall store relative to the other merchandise sold at the same mall store and/or relative to merchandise sold in other mall stores.

In an embodiment merchandise ratings and rankings are stored as decisional data in the mall decisional database 450.

In an embodiment mall store merchandise scores in the mall decisional database 450 are used to generate store scores for the mall stores. In one embodiment a store score is the average of the merchandise scores for the merchandise sold at the respective mall store.

In another embodiment a store score is the lowest merchandise score for the merchandise sold at the mall store. In other embodiments other criteria and/or formulas are used to generate a store score, e.g., the highest mall store merchandise score for the merchandise sold at the mall store, the mean of the mall store merchandise scores for the merchandise sold at the mall store, etc.

In an embodiment store scores are stored as decisional data in the mall decisional database 450.

In an embodiment store scores are used to rate and/or rank the stores in a mall. In an embodiment a store rating or ranking rates or ranks a particular mall store relative to the other stores in the mall.

In an embodiment store ratings and rankings are stored as decisional data in the mall decisional database 450.

In an embodiment mall store merchandise scores in the mall decisional database 450, merchandise ratings and/or rankings in the mall decisional database 450, store scores in the mall decisional database 450 and/or store ratings and/or rankings in the mall decisional database 450 are used to score shopping malls. In one aspect of this embodiment a shopping mall score is the average of the store scores for the stores of the shopping mall. In a second aspect of this embodiment a shopping mall score is the lowest store score for the stores of the shopping mall. In other aspects of this embodiment other criteria and/or formulas are used to generate a shopping mall score, e.g., the highest store score for the stores of the shopping mall, the mean of the store scores for the stores of the shopping mall, etc.

In an embodiment shopping mall scores are stored as decisional data in the mall decisional database 450.

In an embodiment shopping mall scores are used to rate and/or rank shopping malls. In alternative embodiments mall store merchandise scores, merchandise ratings and/or rankings, store scores, store ratings and/or rankings and/or shopping mall scores are used to rate and/or rank shopping malls.

In an embodiment a mall rating or ranking rates or ranks the shopping mall relative to other shopping malls represented in the mall store database 410.

In an embodiment mall ratings and rankings are stored as decisional data in the mall decisional database 450.

In embodiments mall store merchandise scores, store scores, mall scores, merchandise rankings, store rankings, mall rankings, merchandise ratings, store ratings and/or mall ratings can be generated on the fly, when, e.g., prompted by the user for shopping mall decisional information.

In an embodiment decisional data stored in, or otherwise accessed by, the mall decisional database 450 and which can be presented to a user is any information that is accessible to and/or generated by the SMD 400 and can include, but is not limited to, mall store purchase point values stored in the store purchase point database 430 for store merchandise, stores and/or malls, e.g., sales price of merchandise, quality of merchandise, etc.; user-pertinent merchandise; store and/or mall information identified in the user profile 445, e.g., identification that the merchandise is too costly for the user, identification that the mall does not have the stores, or a minimum amount of stores a user is interested in, etc.; merchandise, store and mall scores; merchandise, store and mall rankings; merchandise, store and mall ratings; etc.; and any combinations thereof.

In an embodiment stored decisional data in the mall decisional database 450 is presented to the user 465 to inform the user and assist the user in choosing merchandise in a mall store, choosing a mall store and/or choosing a shopping mall. In an aspect of this embodiment stored decisional data is used to generate an output to be displayed to a user that informs the user on shopping choices 465.

In an embodiment stored decisional data is used to generate an augmented reality output display for a user on their computing and/or mobile device. In an embodiment a user can obtain a picture, or image, of a shopping mall directory from the internet. In another embodiment a user can utilize their mobile device to take a picture, or otherwise scan or import, a shopping mall directory. In embodiments optical character recognition or image recognition technologies are employed to generate a display of a mall directory on the user's mobile device.

Figure 5:
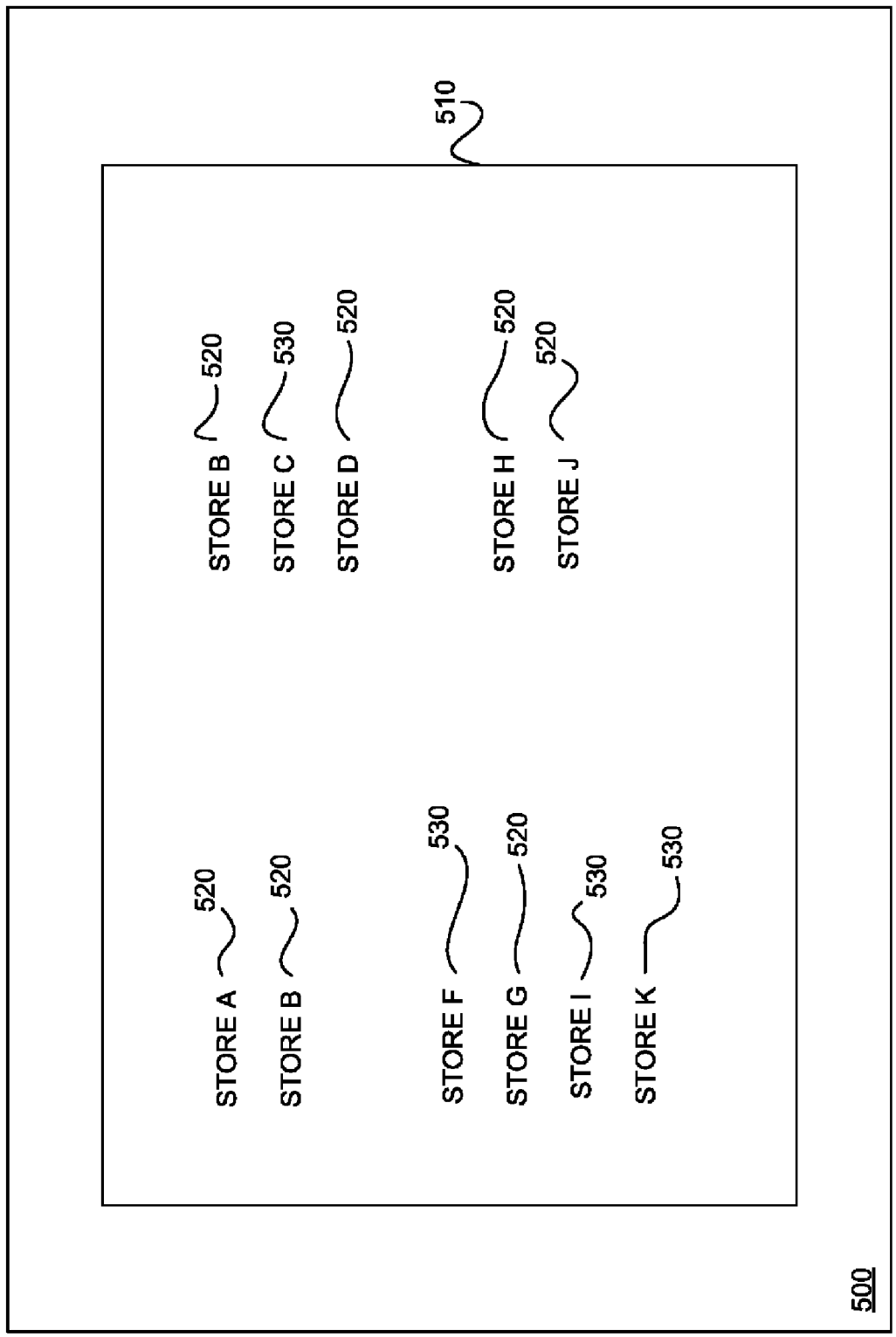
FIG. 5 depicts an embodiment of an exemplary augmented reality display output to a user for an embodiment shopping mall determinator.

In an aspect of these embodiments stored decisional data in the mall decisional database 450 is used to generate an augmented reality display overlaid on the mall directory display output by the user's mobile device. An example of a user mobile device output 500 of an augmented reality display overlaid on a mall directory display is shown in FIG. 5. In embodiments and the example of FIG. 5 the mall stores identified in the mall directory 510 that the user will likely be interested in 520, based on decisional data in the mall decisional database 450, are augmented in one manner. In embodiments and the example of FIG. 5 the mall stores identified in the mall directory 510 that a user will likely not be interested in 530, based on decisional data in the mall decisional database 450, are augmented in a different manner.

In one aspect of these embodiments and the example of FIG. 5, the augmented reality display can include alternative hue highlighting for the mall stores a user is likely to be interested in 520 and the mall stores a user is not likely to be interested in 530, e.g., mall stores the user may wish to visit 520 are highlighted green on the user's mobile device output 500 and mall stores the user will not likely wish to visit 530 are highlighted red.

In a second aspect of these embodiments and the example of FIG. 5, the augmented reality display can treat the mall stores the user will not likely be interested in 530 by deleting them from the display 500, blacking them out on the display 500, crossing them out on the display 500, etc.

In other aspects of these embodiments and the example of FIG. 5, the augmented reality display overlaid on a mall directory display can include a variety of treatments, e.g., using one font and/or font color for stores a user is likely to be interested in 520 and using a second font and/or font color for stores a user is likely not to be interested in 530; using a larger font size for stores a user is likely to be interested in 520 and a smaller font size for stores a user is likely not to be interested in 530, etc.

In an embodiment generated store ratings and/or rankings are output to the user, e.g., via the user's mobile device display screen. In an aspect of this embodiment mall store rankings are identified by an augmented reality display, or treatment, overlaid on the corresponding mall directory display. For example, a star system can be effected overlaid on a mall directory display to identify the corresponding store rankings; e.g., the store with the highest ranking has the most stars pictured next to it and the store with the lowest ranking has no stars pictured next to it, etc. As other examples, highlighting can be used to identify higher ranked stores, alternative highlighting hues can be used to identify higher ranked stores and lower ranked stores, bolding can be used to identify higher ranked stores, etc.

In an aspect of this embodiment a ranking of a set, or subset, of mall stores is output to the user as a list with, e.g., the order of stores identifying their relative ranking, e.g., from highest rank to lowest; a treatment identifying their relative ranking, e.g., higher ranked stores highlighted in green, identified in green font, etc., lower ranked stores highlighted in an alternative hue, e.g., red, identified in red font, etc.; with the store ranking accompanying the list of mall stores ordered alphabetically, etc.; etc.

In an embodiment generated mall ratings and/or rankings are output to the user, e.g., via the user's mobile device display screen. In an aspect of this embodiment a ranking of a set, or subset, of malls represented in the mall store database 410 is output to the user as a list with, e.g., the order of malls identifying their relative ranking and/or rating, e.g., from highest rank to lowest; with the mall rating and/or ranking accompanying the list of shopping malls ordered alphabetically, geographically, e.g., from nearest to farthest from the user's current location, etc.; etc.

In other aspects of this embodiment generated mall ratings and/or rankings of a set, or subset, of shopping malls represented in the mall store database 410 is output to the user in a variety of other, or other combinations of, formats, e.g., identified on a map display accompanied by their rating and/or ranking; formatted in a table that includes, e.g., an identification of the shopping mall, the shopping mall location, the shopping mall rating and/or ranking, and/or additional and/or other combinations of information; etc.

In an embodiment a user, or others, can include additional input data 475 into the SMD 400 that can thereafter be used to render modifications to decisional data stored in the mall decisional database 450. In an embodiment and example, the user may discover that while a mall directory identifies one or more stores, e.g., store A and store D, stores A and D are no longer operating at the mall. In this embodiment and example the user, or others, e.g., the mall director, etc., can add this information to the SMD 400 and data in the mall decisional database 450 will be updated, or otherwise modified, accordingly. For example, the mobile device output for the shopping mall can thereafter be modified so that it no longer identifies stores A and D, the shopping mall rating and/or ranking can be regenerated without information relevant to stores A and D, etc.

As another example in this embodiment, a mall store manager may discover that the sales price identified for a merchandise item sold at their mall store is in error and can modify this data accordingly, by, e.g., inputting the correct sales price for the merchandise to the SMD 400, etc.

In alternative embodiments alternative constructs, workflows and/or components are included in specialized value estimators for individualized topics as previously exemplified with reference to the specialized value estimators of FIG. 1 and FIG. 4. In alternative embodiments alternative databases and/or other data storage components are used to store generated determinator information, i.e., decisional data.

In other embodiments a variety of other data-driven item value determinators can be functionalized using specialized components and a generalized processing flow exemplified in the embodiment EEND 100 of FIG. 1 and the embodiment SMD 400 of FIG. 4. Components containing values mined from the internet, input by a user or others and/or scanned and imported and/or generated from such values or combination of values that are relevant to a specific data-driven item value determinator can be utilized in a processing flow that is adapted to the specific item value determinator to generate decisional data for a user to make informed and personal choices there from.

Figure 6:
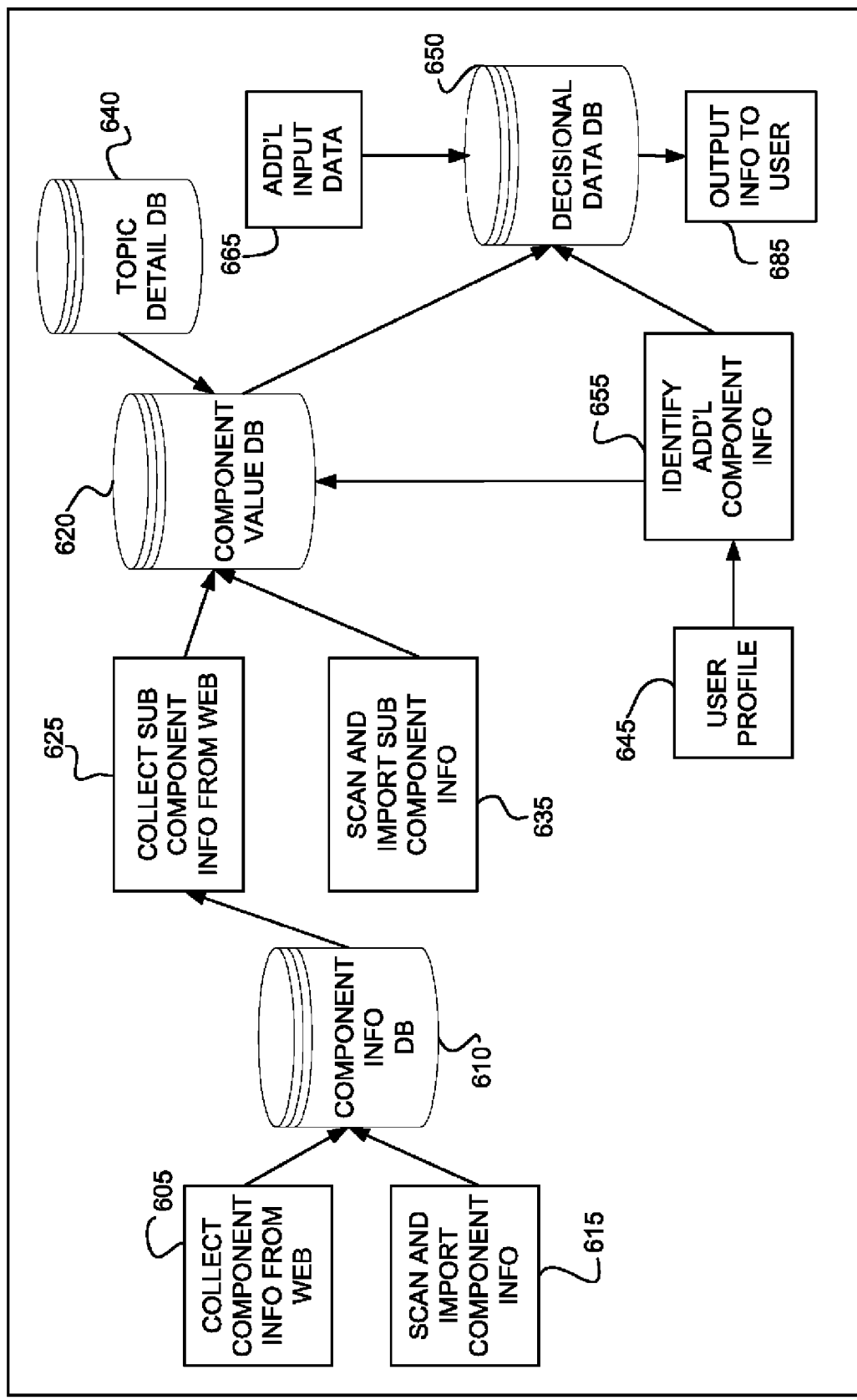
FIG. 6 depicts components and processing flow for an embodiment generalized data-driven item value determinator.

To this end, and referring to FIG. 6, a components and generalized processing flow for a generalized data-driven item value determinator 600 is depicted. In embodiments the generalized data-driven item value determinator 600, also referred to herein as a general IVD 600, can be tailored for use as a specialized data-driven item value determinator, such as, but not limited to, the embodiment eating establishment nutrition determinator 100 of FIG. 1 and the embodiment shopping mall determinator 400 of FIG. 4. In conjunction with the general IVD 600 of FIG. 6, FIG. 7 provides examples for embodiment specialized data-driven item value determinator functionality when the general IVD 600 is tailored to a specific exemplary functionality.

Referring to FIG. 6, in an embodiment the topic of the target decisional data is parsed into a set of one or more components, or constituents, and/or the components are otherwise identified, collectively referred to herein as being parsed, and information for respective constituent elements is collected, or otherwise mined, from the internet 605. Referring to FIG. 7, in an embodiment the topic of the specialized decisional data is parsed into a set of one or more components, or constituents, and information for respective constituent elements is collected, or otherwise mined, from the internet 705. For example, for an embodiment EEND 100 of FIG. 1, the eating establishment nutrition topic is parsed into a set of at least one component, or constituent, i.e., eating establishments, and the internet is crawled, or searched, for elemental information, e.g., eating establishment menus, 706. As another example, for an embodiment SMD 400 of FIG. 4, the shopping mall topic is parsed into a set of at least one component or constituent, i.e., shopping malls, and the internet is crawled for elemental information, e.g., an identification of the respective mall stores, 707.

Referring to FIG. 6, in an embodiment the topic of the target decisional data is parsed into a set of one or more components, or constituents, and information for respective constituent elements is also, or alternatively, scanned and imported from various text inclusive media 615, e.g., books, magazines, menus, maps, component sheets, labels, signs, directories, etc.

In an embodiment element information can also be input, e.g., typed in, photographed, etc., 115 by a user or others for access by the general IVD 600.

In an embodiment collected element information, also referred to herein as component information, is stored in, or otherwise referenced by, a component info database 610.

In an embodiment the component info database 610 is used, or referenced, to collect, or otherwise mine, subcomponent information from the internet 625. Referring to FIG. 7, in an embodiment the internet is crawled, or searched, for one or more of a set of second items 710. For example, for an embodiment EEND 100 of FIG. 1 the internet is crawled for recipes, the set of second items, for menu dishes 711. As a second example, for an embodiment SMD 400 of FIG. 4 the internet is crawled for an identification of the merchandise sold, the set of second items, at mall stores 712.

In embodiments subcomponent information may need to be further broken down, or otherwise parsed. For example, in an embodiment EEND 100 of FIG. 1 the subcomponent information, or set of second items, i.e., the collected recipes, can be further parsed to identify the ingredients therein and their quantities.

Referring to FIG. 6, in an embodiment the component info database 610 is also, or alternatively, used, or referenced, for scanning and importing subcomponent information from various text inclusive media 635, e.g., books, magazines, catalogs, spec sheets, pamphlets, etc.

In an embodiment the component info database 610 is also, or alternatively, used, or referenced, for assisting user or other input, e.g., typing, photographing, etc., subcomponent information 635 for access by the general IVD 600.

In an embodiment a database, or databases, of topic relevant details 640, referred to herein collectively as a topic detail database 640, contains, or otherwise references, detail information for the topic at hand. For example, in an embodiment EEND 100 of FIG. 1, a topic detail database 640 is a nutrition info database 140 which contains, or otherwise references, nutrition information on ingredients in recipes and/or recipes themselves, such as calorie count, grams of fat, amount of sugar, vitamins, etc.

In an embodiment the topic detail database 640 is generated and populated by the general IVD 600 with information mined from the internet, scanned and imported and/or input by a user or others. In an embodiment information in the topic detail database 640 can be modified by a user and/or others, or updated with new information mined from the internet and/or scanned and imported.

In an alternate embodiment the topic detail database 640 exists, having been previously generated and populated, and the data therein is accessed and/or referenced by the general IVD 600.

In an embodiment information in the topic detail database 640 is accessed for use in producing, or otherwise generating, a set of third items that provide a basis for the creation of decisional data for the determinator topic. In an embodiment the generated set of third items are stored in a component value database 620.

Figure 7A:
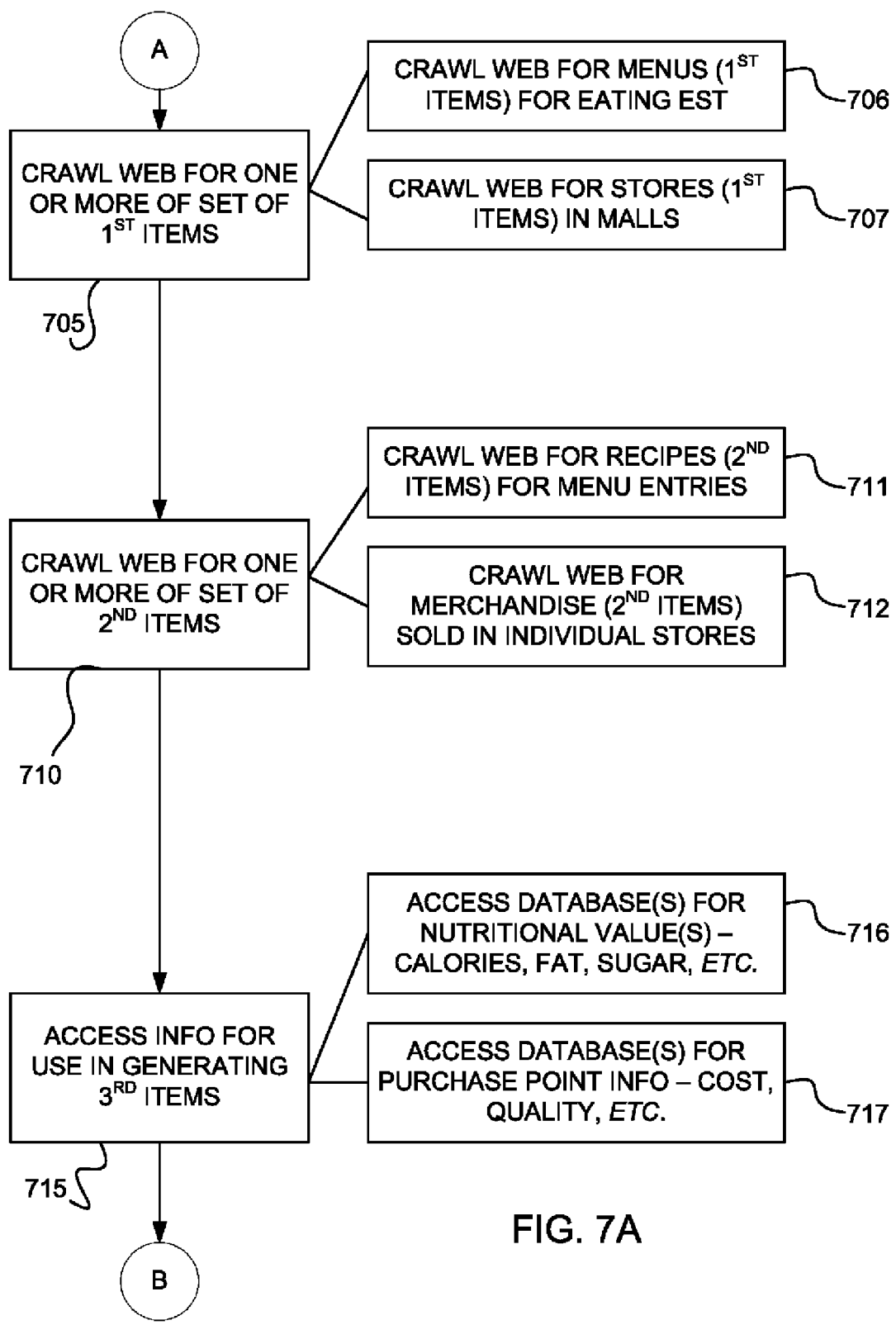
FIGS. 7A-7C illustrate an embodiment logic flow for an embodiment generalized data-driven item value determinator with exemplary logic for an embodiment eating establishment nutrition determinator and an embodiment shopping mall determinator.

Referring to FIG. 7A, in an embodiment information stored in or otherwise referenced by the topic detail database is accessed for use in producing, or otherwise generating, a set of third items that are stored in a component value database 715. For example, for an embodiment EEND 100 of FIG. 1 a nutrition info database is accessed for nutrition data, e.g., calories, grams of fat, etc., for recipe ingredients and/or recipes 716. As another example, for an embodiment SMD 400 of FIG. 4 a merchandise info database is accessed for purchase point data, e.g., sales cost, merchandise quality, etc., for merchandise sold in mall stores 717.

Figure 7B:
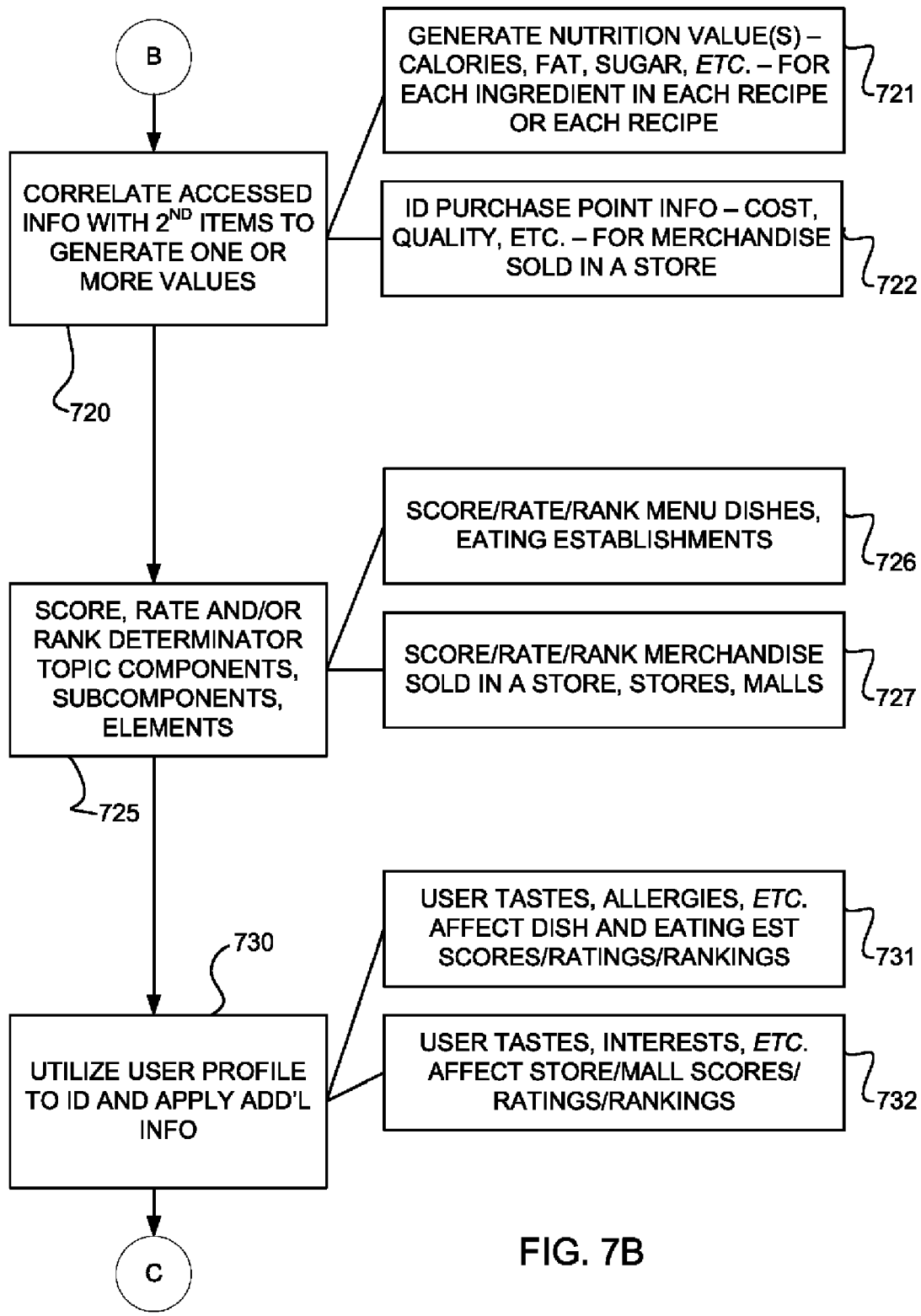

In an embodiment information stored in or otherwise referenced by the topic detail database 640 is used by the general IVD 600 to produce, or otherwise generate, a set of third items and store them in a component value database 620. Referring to FIG. 7B, information accessed from, or via, the topic detail database is correlated, or otherwise collated, with one or more subcomponents, or smaller parsed elements, to generate one or more component values 720.

For example, for an embodiment EEND 100 of FIG. 1 nutrition information accessed from, or via, the nutrition info database is collated with the ingredients and their quantities for a recipe to generate one or more nutritional values for a menu recipe 721. As another example, for an alternative embodiment EEND 100 where the nutrition info database 140 contains nutrition values for recipes, the respective, relevant nutrition information for menu recipes is retrieved from the nutrition info database 721 and stored in, or otherwise referenced by, the component value database 620, e.g., the dish alimentary database 120 of FIG. 1.

In another example, for the embodiment SMD 400 of FIG. 4 purchase point information, e.g., sales cost, merchandise quality, etc., for merchandise sold in mall stores is retrieved from the merchandise info database 722 and stored in, or otherwise referenced by, the component value database 620, e.g., the store purchase point database 430.

Referring to FIG. 6, in an embodiment data in the component value database 620 is used to generate scores for determinator topic components and/or subcomponents and/or smaller parsed elements. In an embodiment generated scores are stored in a decisional data database, or databases, collectively referred to herein as a decisional data database 650. In an embodiment data stored in the component value database 620 is also, or alternatively, used to generate ratings for determinator topic components and/or subcomponents and/or smaller parsed elements. In an embodiment data stored in the component value database 620 is also, or alternatively, used to generate rankings for determinator topic components and/or subcomponents and/or smaller parsed elements. In an embodiment generated ratings and rankings are stored in the decisional data database 650.

Referring to FIG. 7B, in a general IVD 600 scores, ratings and/or rankings are generated for determinator topic components and/or subcomponents and/or smaller parsed elements 725. For example, in an embodiment EEND 100 of FIG. 1 scores, ratings and/or rankings are generated for menu dishes and/or eating establishments 726. As another example, in an embodiment SMD 400 of FIG. 4 scores, ratings and/or rankings are generated for merchandise items sold in a mall store, mall stores, and/or malls 727.

Again referring to FIG. 6, in an embodiment a user is prompted, or otherwise provided access, to generate a user profile 645 relevant to the determinator topic. In an embodiment the user profile 645 can be updated, enhanced, modified and/or deleted by the user at the user's determination. In an embodiment a user profile 645 contains information on the user's tastes, preferences, issues, concerns, etc. related to the determinator topic.

In an embodiment information in the user profile 645 is used to identify additional component information 655 that is then utilized to generate, or otherwise modify or enhance, resultant decisional data that is specific to the user. Thus, referring to FIG. 7B, in an embodiment relevant information in a user profile is identified and applied to modify, or otherwise enhance, decisional data stored in the decisional data database for use in informing a user on aspects of the determinator topic 730. For example, in an embodiment EEND 100 of FIG. 1 user tastes, e.g., vegetarian dishes, etc., allergies, dietary issues, e.g., calorie restrictions, lactose intolerant, etc., etc. are identified in the user profile and used to modify scores, ratings and/or rankings of menu dishes and/or eating establishments 731. As another example, in an embodiment SMD 400 of FIG. 4 user tastes, e.g., designer clothes, wooden toys, etc., price point requirements, e.g., no one item costs more than twenty dollars, etc., etc. are identified in the user profile and used to modify scores, ratings and/or rankings for store merchandise, stores and/or malls 732.

Figure 7C:
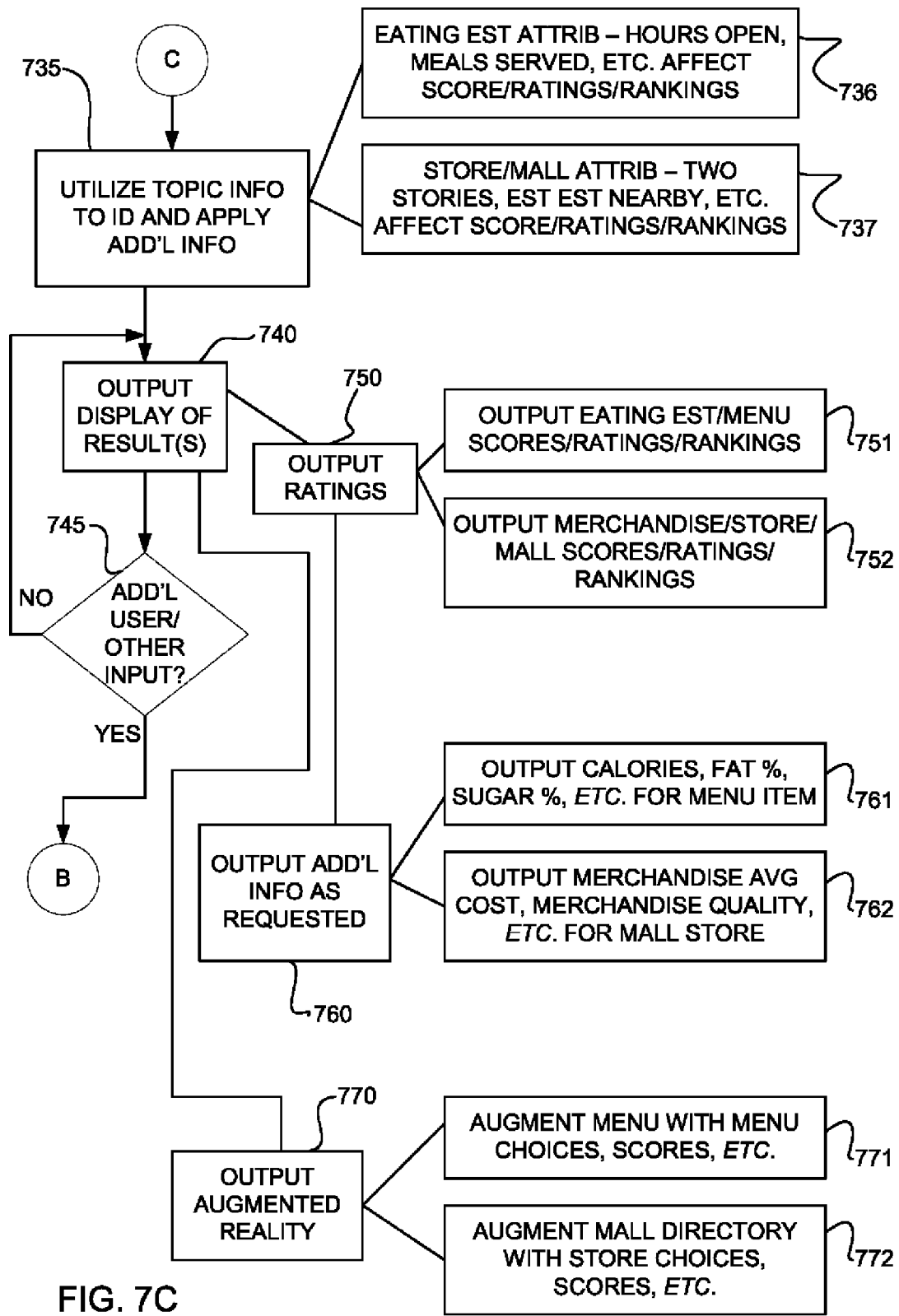

Referring to FIG. 7C, in an embodiment information on component, or constituent, and/or element attributes can be used to modify or enhance resultant decisional data 735. In an aspect of this embodiment information on component attributes is collated with user profile data to modify, or otherwise tailor, resultant decisional data to the specific user 735. For example, in an embodiment EEND 100 of FIG. 1 eating establishment attributes, e.g., hours open, number of meals served, e.g., breakfast and lunch, or breakfast, lunch and dinner, etc., etc., are used to modify eating establishment scores, ratings and/or rankings 736. As another example, in an embodiment SMD 400 of FIG. 4 store and/or shopping mall attributes, e.g., two-story establishments, eating establishment nearby, available valet parking, etc., are used to modify scores, ratings and/or rankings for stores and/or malls 737.

Referring again to FIG. 6, in an embodiment decisional data in the component value database 620, e.g., cost information, nutritional information, etc., information in the user profile 645, e.g., tastes, requirements, budgetary restrictions, etc., and/or decisional data, e.g., scores, ratings, etc., in the decisional data database 650 are used to generate output(s) that are presented to a user 685 and with which the user can refer to quickly and efficiently render decisions on the determinator topic.

Referring to FIG. 7C, in an embodiment generated value information and/or decisional data is output and/or identifications thereof are output to a user 740. In an embodiment scores, ratings and/or rankings are output or otherwise identified to a user 750. For example, in an embodiment EEND 100 of FIG. 1 menu dish and/or eating establishment scores, ratings and/or rankings can be output or otherwise identified to a user 751. As another example, in an embodiment SMD 400 of FIG. 4 merchandise, store and/or mall scores, ratings and/or rankings can be output or otherwise identified to a user 752.

In an embodiment additional determinator topic information can be output to a user as requested 760. For example, in an embodiment EEND 100 of FIG. 1 menu dish calories, percentage of sugar, grams of fat, ingredients that may be of concern to the user, etc., can be output or otherwise identified to a user 761. As another example, in an embodiment SMD 400 of FIG. 4 the average cost of merchandise in a store and/or mall, the average quality of merchandise in a store and/or mall, etc. can be output or otherwise identified to a user 762.

In an embodiment augmented realities of the determinator topic or one or more of the topic components, subcomponents, elements, etc. can be output to the user 770. For example, in an embodiment EEND 100 of FIG. 1, an augmented reality output can display an eating establishment menu with optimum user dishes indicated in one manner, e.g., highlighted, highlighted in a first color, font, size, etc., and user unacceptable dishes either indicated in a second manner, e.g., not highlighted, highlighted in a second color, font, size, etc., or simply not presented in the display, etc., etc. 771. As a second example, in an embodiment SMD 400 of FIG. 4, an augmented reality output can display a mall directory with optimum user store choices indicated in one manner and user unacceptable stores indicated in a second manner or not identified at all, a map with optimum user shopping mall choices indicated appropriately thereon, etc. 772.

Referring to FIG. 6, in a general IVD 600 additional topic relevant information 665 can be introduced by a user or others which can affect the decisional data and/or output displayed to the user. For example, a user can determine that while an eating establishment menu identifies a dish A, this dish A is no longer served. The user can input this additional information 665 which can result in the output displayed to the user no longer identifying dish A for the respective eating establishment. As another example, a restaurant chef may update the calorie information for a menu dish ingredient, or a menu dish recipe, which can result in the modification of the respective dish's score, rating and/or ranking.

Referring to FIG. 7C, in an embodiment general IVD 600 at decision block 745 a determination is made as to whether additional relevant information has been introduced to the IVD. If no, in an embodiment current decisional data is output to the user as requested 740. If, however, additional relevant information has been introduced to the IVD then, referring to FIG. 7B, in an embodiment the affected component, subcomponent and/or element values are modified or otherwise updated 720 and respective scores, ratings and/or rankings are regenerated 725.

As previously indicated, in embodiments alternative constructs, workflows, components, or elements, and/or component, or element, combinations can be included in any specialized determinator for an individual topic.

Also as previously noted, in embodiments a wide variety of other data-driven item value determinators can be functionalized using specialized components and a generalized processing flow exemplified in the embodiment EEND 100 of FIG. 1 and the embodiment SMD 400 of FIG. 4. For example, components and processing flow tailored for handling radio components can be used to create a radio component cost determinator. As another example, components and processing flow tailored for managing value choices for food purchased from grocery stores can be used to create a grocery store value determinator.

As a third example, systems and methodology described herein can be tailored for deriving travel logs, from information mined from the internet and/or otherwise input, for use in generating decisional data relevant to cost, user satisfaction, time to travel, difficulty, e.g., climbing Mount Everest would be scored more difficult while relaxing at a resort in the Caribbean would be scored less difficult, etc., etc. This generated decisional data would be effective for aiding users to make informed travel choices on a myriad of travel topics.

As still another example, systems and methodology described herein can be tailored for generating decisional data that is reflective of the cost of living associated with a geographical area, e.g., a neighborhood, town, state, country, etc. In this example various information can be mined on the internet and/or otherwise input, and/or generated from information mined on the internet or otherwise input, that is reflective of the geographical area in question, e.g., cost of dining in eating establishments in the geographical area, housing costs in the geographical area, average income earned by residents of the geographical area, etc. This generated decisional data would be effective for aiding users to make informed choices about activities in a geographical area, e.g., where they may wish to purchase a residence, where they may wish to dine, etc.

Thus, as can be seen, the systems and methodology described herein can be flexibly adapted to a wide range of decisional data topics.

Figure 8:
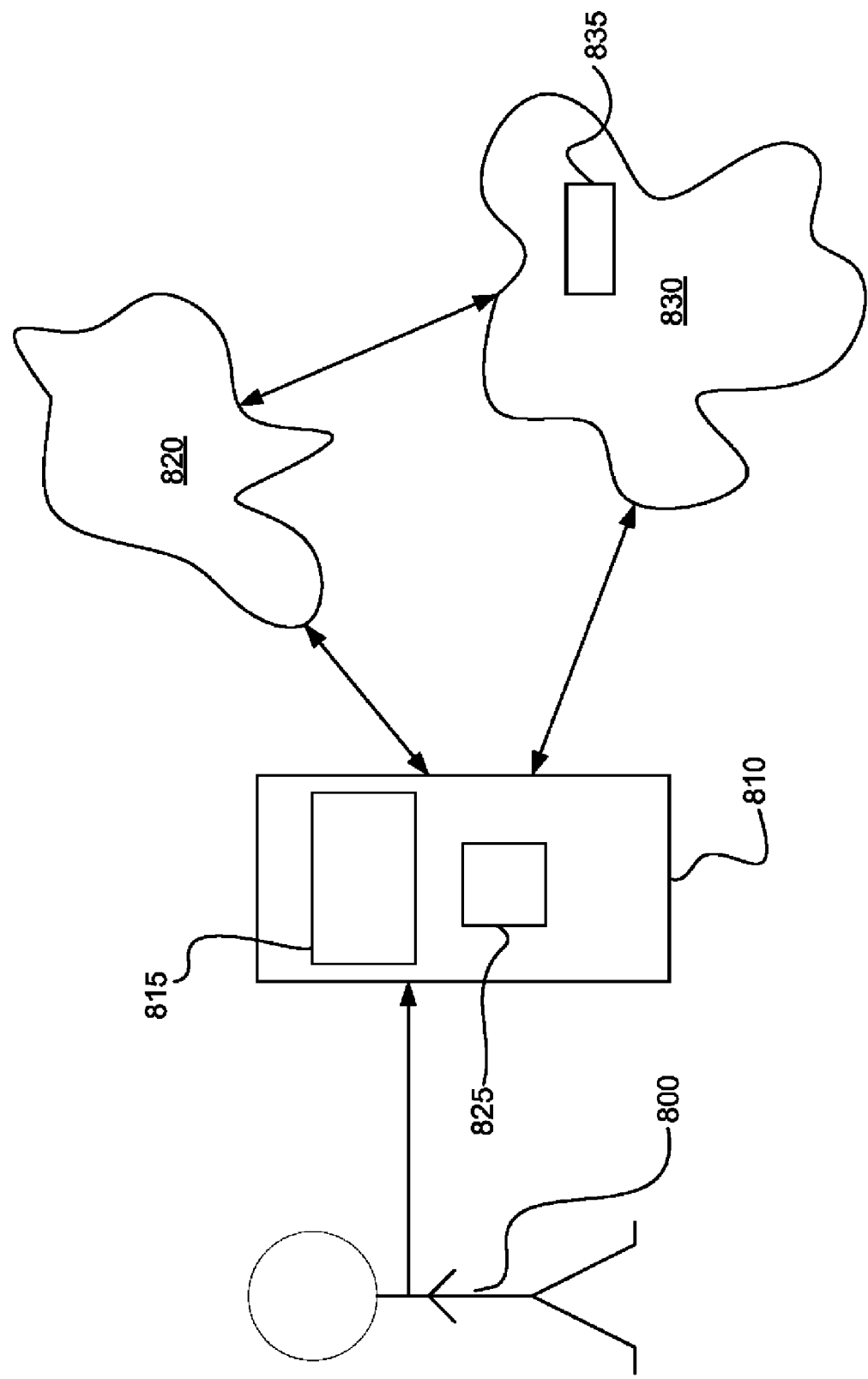
FIG. 8 illustrates an embodiment data-driven item value determinator environment.

FIG. 8 illustrates an embodiment data-driven item value determinator environment. In an embodiment a user 800 accesses or otherwise utilizes a mobile device 810 for displaying decisional data on the determinator topic to the user 800. In an embodiment the mobile device 810 has a display 815, e.g., screen, component, for displaying decisional data, or an identification or presentation thereof, to the user 800.

In an embodiment the mobile device 810 is a wireless mobile device. In an embodiment the mobile device 810 is a hand-held device. In an embodiment the mobile device 810 is a computing device and/or has computing power, i.e., functionality. In an embodiment the mobile device 810 has a telephone, or telephone capabilities, e.g., a cell phone, smart phone, etc.

In an embodiment the mobile device 810 executes the functionality of the data-driven item value determinator utilizing its computing power and by accessing the internet 820 to mine relevant topic data there from. In an aspect of this embodiment the mobile device 810 executes, or otherwise runs, one or more computer programs, or applications, 825 that have one or more components, or functionality, with the capability of performing steps, or tasks, described herein for a data-driven item value determinator.

In an alternative embodiment the data-driven item value determinator functionality is performed by, or otherwise at, a computing cloud 830, also referred to herein as a cloud 830. In this alternative embodiment the mobile device 810 communicates with the cloud 830 to obtain decisional data generated by, or at, the cloud 830 and/or output generated by, or at, the cloud 830 to present to a user 800 on the mobile device display 815. In an aspect of this alternative embodiment the cloud 830 executes, or otherwise runs, one or more computer programs, or applications, 835 that have one or more components, or functionality, with the capability of performing steps, or tasks, described herein for a data-driven item value determinator.

Computing Device System Configuration

Figure 9:
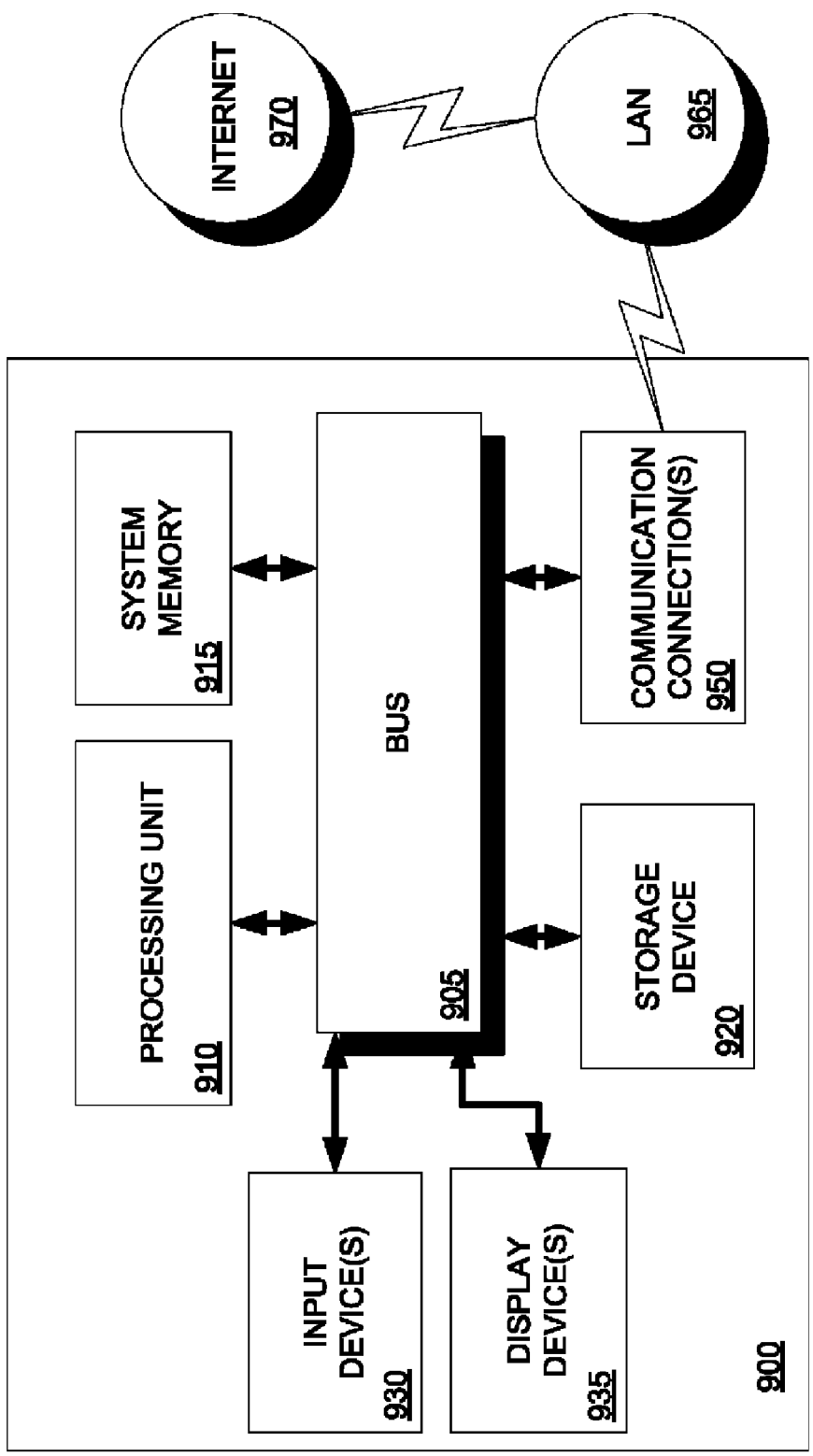
FIG. 9 is a block diagram of an exemplary basic computing device system that can process software, i.e., program code, or instructions.

FIG. 9 is a block diagram that illustrates an exemplary computing device system 900 upon which an embodiment can be implemented. Examples of computing device systems, or computing devices, 900 include, but are not limited to, computers, e.g., desktop computers, computer laptops, also referred to herein as laptops, notebooks, etc.; smart phones; etc.

The embodiment computing device system 900 includes a bus 905 or other mechanism for communicating information, and a processing unit 910, also referred to herein as a processor 910, coupled with the bus 905 for processing information. The computing device system 900 also includes system memory 915, which may be volatile or dynamic, such as random access memory (RAM), non-volatile or static, such as read-only memory (ROM) or flash memory, or some combination of the two. The system memory 915 is coupled to the bus 905 for storing information and instructions to be executed by the processing unit 910, and may also be used for storing temporary variables or other intermediate information during the execution of instructions by the processor 910. The system memory 915 often contains an operating system and one or more programs, or applications, and/or software code, and may also include program data.

In an embodiment a storage device 920, such as a magnetic or optical disk, is also coupled to the bus 905 for storing information, including program code of instructions and/or data. In the embodiment computing device system 900 the storage device 920 is computer readable storage, or machine readable storage, 920.

Embodiment computing device systems 900 generally include one or more display devices 935, such as, but not limited to, a display screen, e.g., a cathode ray tube (CRT) or liquid crystal display (LCD), a printer, and one or more speakers, for providing information to a computing device user. Embodiment computing device systems 900 also generally include one or more input devices 930, such as, but not limited to, a keyboard, mouse, trackball, pen, voice input device(s), and touch input devices, which a user can utilize to communicate information and command selections to the processor 910. All of these devices are known in the art and need not be discussed at length here.

The processor 910 executes one or more sequences of one or more program, or application, and/or software code instructions contained in the system memory 915. These instructions may be read into the system memory 915 from another computing device-readable medium, including, but not limited to, the storage device 920. In alternative embodiments, hard-wired circuitry may be used in place of or in combination with software instructions. Embodiment computing device system 900 environments are not limited to any specific combination of hardware circuitry and/or software.

The term "computing device-readable medium" as used herein refers to any medium that can participate in providing program, or application, and/or software instructions to the processor 910 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 915 and storage device 920 of embodiment computing device systems 900 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device system 900 also includes one or more communication connections 950 coupled to the bus 905. Embodiment communication connection(s) 950 provide a two-way data communication coupling from the computing device system 900 to other computing devices on a local area network (LAN) 965 and/or wide area network (WAN), including the world wide web, or internet 970. Examples of the communication connection(s) 950 include, but are not limited to, an integrated services digital network (ISDN) card, modem, LAN card, and any device capable of sending and receiving electrical, electromagnetic, optical, acoustic, RF or infrared signals.

Communications received by an embodiment computing device system 900 can include program, or application, and/or software instructions and data. Instructions received by the embodiment computing device system 900 may be executed by the processor 910 as they are received, and/or stored in the storage device 920 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for generating and outputting to a user deterministic data for the user to make decisions for a set of eating establishments comprising at least one eating establishment, the method comprising:
   receiving an eating establishment inquiry from a user;
   collecting at least one menu comprising collected menus for the set of eating establishments;
   parsing at least one menu of the collected menus into a set of dishes comprising dishes identified on the at least one menu;
   determining that a recipe utilized by an eating establishment for a first dish from the set of dishes cannot be located;
   in response to at least the determination that a recipe utilized by an eating establishment for the first dish cannot be located, collecting a set of recipes comprising at least two recipes for the first dish by utilizing at least a device accessing the internet;
   identifying a recipe utilizing the collected recipes to be the recipe for the first dish wherein the identified recipe comprises a first recipe;
   ranking at least two of the set of dishes wherein the ranking is based at least in part on the first recipe and a nutritional consideration; and
   outputting an indication of the ranking to the user.

2. The method for generating and outputting to a user deterministic data for the user to make decisions for a set of eating establishments of claim 1, further comprising:
   determining that a recipe utilized by an eating establishment for a second dish from the set of dishes can be located wherein the recipe utilized by an eating establishment for the second dish comprises a second recipe;
   identifying the second recipe as the recipe for the second dish; and
   ranking at least two of the set of dishes identified on a collected menu wherein the ranking comprises a ranking of the first dish and a ranking of the second dish, and wherein the ranking is based at least in part on the first recipe and at least in part on the second recipe.

3. The method for generating and outputting to a user deterministic data for the user to make decisions for a set of eating establishments of claim 1, further comprising:
   determining that a recipe utilized by an eating establishment for a third dish from the set of dishes cannot be located;
   in response to at least the determination that a recipe utilized by an eating establishment for the third dish cannot be located, collecting a set of recipes comprising at least two recipes for the third dish by utilizing at least the device accessing the internet; and
   utilizing at least two recipes from the set of recipes collected for the third dish to generate a new recipe comprising a third recipe to be identified as the recipe for the third dish wherein the third recipe comprises ingredient amounts from at least two recipes from the collected recipes.

4. The method for generating and outputting to a user deterministic data for the user to make decisions for a set of eating establishments of claim 1, wherein the nutritional consideration comprises a calorie count for each of the at least two dishes of the set of dishes ranked.

5. The method for generating and outputting to a user deterministic data for the user to make decisions for a set of eating establishments of claim 1, wherein the nutritional consideration comprises a grams of fat content for each of the at least two dishes of the set of dishes ranked.

6. The method for generating and outputting to a user deterministic data for the user to make decisions for a set of eating establishments of claim 1, wherein the nutritional consideration comprises an identification that either the user is allergic to an item that may be an ingredient in at least one of the at least two dishes of the set of dishes ranked or an identification that the user dislikes an item that may be an ingredient in at least one of the at least two dishes of the set of dishes ranked.

7. The method for generating and outputting to a user deterministic data for the user to make decisions for a set of eating establishments of claim 1, further comprising:
  generating a display of the menu for an eating establishment;
  augmenting the display of the menu for the eating establishment to indicate the ranking of the at least two dishes of the set of dishes identified on the menu; and
  outputting the augmented display of the menu for the eating establishment to the user.

8. The method for generating and outputting to a user deterministic data for the user to make decisions for a set of eating establishments of claim 1, further comprising:
  utilizing a user wireless, mobile computing device to communicate with a computing cloud wherein the computing cloud determines that the recipe utilized by an eating establishment for the first dish cannot be located, the computing cloud, in response to at least the determination that the recipe utilized by an eating establishment for the first dish cannot be located, collects via the internet the set of recipes comprising at least two recipes for the first dish, the computing cloud identifies the recipe utilizing the collected recipes to be the recipe for the first dish, and the computing cloud ranks the at least two dishes of the set of dishes, and wherein the user wireless, mobile computing device comprises a communication element comprising the capability to communicate with the computing cloud; and
  utilizing the user wireless, mobile computing device to display the indication of the ranking to the user, wherein the user wireless, mobile computing device comprises a display element comprising the capability to output information to a user.

9. A tangible computer-readable medium having computer-executable instructions stored thereon that when executed by a processor of a computing device implement a method for generating and outputting to a user deterministic data for the user to make decisions for a set of eating establishments comprising at least one eating establishment, the computer-readable medium comprising:
  computer-executable instructions for receiving an eating establishment inquiry from a user;
  computer-executable instructions for collecting at least one menu comprising collected menus for the set of eating establishments;
  computer-executable instructions for parsing at least one menu of the collected menus into a set of dishes comprising dishes identified on the at least one menu;
  computer-executable instructions for determining that a recipe utilized by an eating establishment for a first dish from the set of dishes cannot be located;
  computer-executable instructions that, in response to at least the determination that a recipe utilized by an eating establishment for the first dish cannot be located, collect via the internet a set of recipes comprising at least two recipes for the first dish;
  computer-executable instructions for identifying a recipe utilizing the collected recipes to be the recipe for the first dish wherein the identified recipe comprises a first recipe;
  computer-executable instructions for ranking at least two of the set of dishes wherein the ranking is based at least in part on the first recipe and a nutritional consideration; and
  computer-executable instructions for outputting an indication of the ranking to the user.

10. The tangible computer-readable medium of claim 9, further comprising:
  computer-executable instructions for determining that a recipe utilized by an eating establishment for a second dish from the set of dishes can be located wherein the recipe utilized by an eating establishment for the second dish comprises a second recipe;
  computer-executable instructions for identifying the second recipe as the recipe for the second dish; and
  computer-executable instructions for ranking at least two of the set of dishes identified on a collected menu wherein the ranking comprises a ranking of the first dish and a ranking of the second dish, and wherein the ranking is based at least in part on the first recipe and at least in part on the second recipe.

11. The tangible computer-readable medium of claim 9, further comprising:
  computer-executable instructions for determining that a recipe utilized by an eating establishment for a third dish from the set of dishes cannot be located;
  computer-executable instructions that, in response to at least the determination that a recipe utilized by an eating establishment for the third dish cannot be located, collects a set of recipes comprising at least two recipes for the third dish by accessing the internet; and
  computer-executable instructions for utilizing at least two recipes from the set of recipes collected for the third dish to generate a new recipe comprising a third recipe to be identified as the recipe for the third dish wherein the third recipe comprises ingredient amounts from at least two recipes from the collected recipes.

12. The tangible computer-readable medium of claim 9, wherein one or more of the computer-executable instructions are configured to execute on a wireless mobile computing device of the user.

13. The tangible computer-readable medium of claim 9, further comprising:
  computer-executable instructions for populating a user profile with data comprising user-specific data relevant to eating establishments and at least one nutritional consideration for the user;
  computer-executable instructions for modifying the ranking of at least one dish of the set of dishes ranked based on data in the user profile; and
  computer-executable instructions for outputting to the user an indication of the modification of the ranking of the at least one dish.

14. The tangible computer-readable medium of claim 9, wherein the nutritional consideration comprises at least one of a set of nutritional considerations comprising calorie counts for dishes, grams of fat content for dishes, the user's allergy to an ingredient that may be in a dish, and the user's dislike of an ingredient that may be in a dish.

15. A system for generating and outputting to a user deterministic data for the user to make decisions for a set of eating establishments comprising at least one eating establishment, the system comprising:
a computing device processor and memory configured with instructions which when executed by the computing device processor cause the computing device processor to perform the following steps:
receive an eating establishment inquiry from a user;
collect at least one menu comprising collected menus for the set of eating establishments wherein one menu of the collected menus comprises a first menu for a first eating establishment;
parse the first menu into a first set of dishes comprising dishes identified on the first menu;
determine that a recipe utilized by the first eating establishment for a first dish from the first set of dishes cannot be located;
in response to at least the determination that a recipe utilized by the first eating establishment for the first dish cannot be located, collect a first set of recipes comprising at least two recipes for the first dish by utilizing at least a device accessing the internet;
identify a recipe utilizing the collected first set of recipes to be the recipe for the first dish wherein the identified recipe comprises a first recipe;
rank at least two of the first set of dishes wherein the ranking is based at least in part on the first recipe and a nutritional consideration; and
output an indication of the ranking to the user.

16. The system for generating and outputting to a user deterministic data for the user to make decisions for a set of eating establishments of claim 15, wherein the instructions further cause the computing device processor to:
determine that a recipe utilized by the first eating establishment for a second dish from the first set of dishes can be located wherein the recipe utilized by the first eating establishment for the second dish comprises a second recipe;
identify the second recipe as the recipe for the second dish; and
rank at least two of the first set of dishes identified on the first menu wherein the ranking comprises a ranking of the first dish and a ranking of the second dish, and wherein the ranking is based at least in part on the first recipe and at least in part on the second recipe.

17. The system for generating and outputting to a user deterministic data for the user to make decisions for a set of eating establishments of claim 15, wherein the instructions further cause the computing device processor to:
determine that a recipe utilized by the first eating establishment for a third dish from the first set of dishes cannot be located;
in response to at least the determination that a recipe utilized by the first eating establishment for the third dish cannot be located, collect a second set of recipes comprising at least two recipes for the third dish by utilizing at least the device accessing the internet; and
utilize at least two recipes from the second set of recipes collected for the third dish to generate a new recipe comprising a third recipe to be identified as the recipe for the third dish wherein the third recipe comprises ingredient amounts from at least two recipes from the second set of recipes.

18. The system for generating and outputting to a user deterministic data for the user to make decisions for a set of eating establishments of claim 15, wherein the instructions further cause the computing device processor to:
collect at least one second menu for a second eating establishment;
parse the second menu into a second set of dishes comprising dishes identified on the second menu;
identify a recipe located by at least the device accessing the internet to be the recipe for a second dish identified on the second menu wherein the identified recipe for the second dish comprises a second recipe;
rank at least a subset of the set of eating establishments wherein the subset comprises the first eating establishment and the second eating establishment, and wherein the ranking is based at least in part on the first recipe, the second recipe and a nutritional consideration; and
output an indication of the ranking of the eating establishments to the user.

19. The system for generating and outputting to a user deterministic data for the user to make decisions for a set of eating establishments of claim 18, wherein the instructions further cause the computing device processor to:
generate a first score for the first eating establishment wherein the first score is determined at least in part by the first recipe and the nutritional consideration;
generate a second score for the second eating establishment wherein the second score is determined at least in part by the second recipe and the nutritional consideration; and
rank the at least subset of the set of eating establishments based at least in part on the first score and the second score.

20. The system for generating and outputting to a user deterministic data for the user to make decisions for a set of eating establishments of claim 19, wherein the nutritional consideration comprises at least one of a set of nutritional considerations comprising calorie counts for dishes, grams of fat content for dishes, the user's allergy to an ingredient that may be in a dish, and the user's dislike of an ingredient that may be in a dish.

* * * * *